United States Patent
Bouquerand et al.

(10) Patent No.: US 11,266,172 B2
(45) Date of Patent: Mar. 8, 2022

(54) PROCESS FOR DRYING A SUSPENSION AT ROOM TEMPERATURE

(71) Applicant: Firmenich SA, Satigny (CH)

(72) Inventors: Pierre-Etienne Bouquerand, Geneva (CH); Amal Elabbadi, Geneva (CH); Serge Maio, Geneva (CH); Gregory Dardelle, Geneva (CH); Valery Normand, Plainsboro, NJ (US)

(73) Assignee: FIRMENICH SA, Geneva (CH)

( * ) Notice: Subject to any disclaimer, the term of this patent is extended or adjusted under 35 U.S.C. 154(b) by 672 days.

(21) Appl. No.: 16/074,076

(22) PCT Filed: Feb. 2, 2017

(86) PCT No.: PCT/EP2017/052287
§ 371 (c)(1),
(2) Date: Jul. 30, 2018

(87) PCT Pub. No.: WO2017/134179
PCT Pub. Date: Aug. 10, 2017

(65) Prior Publication Data
US 2019/0045824 A1    Feb. 14, 2019

(30) Foreign Application Priority Data
Feb. 2, 2016  (EP) .................................. 16153927

(51) Int. Cl.
*B01J 13/22*  (2006.01)
*C11D 3/50*  (2006.01)
(Continued)

(52) U.S. Cl.
CPC ............. *A23L 27/72* (2016.08); *A23L 29/212* (2016.08); *A23L 29/35* (2016.08); *B01J 13/22* (2013.01); *C11D 3/505* (2013.01)

(58) Field of Classification Search
CPC ........ A23L 27/72; A23L 29/212; A23L 29/35; B01J 13/22; C11D 3/505
See application file for complete search history.

(56) References Cited

U.S. PATENT DOCUMENTS

2006/0292280 A1 * 12/2006 Soper ...................... A23L 27/72
426/534
2007/0078071 A1    4/2007 Lee et al.
(Continued)

FOREIGN PATENT DOCUMENTS

EP       2897723           7/2015
WO       1997013416 A1    4/1997
(Continued)

OTHER PUBLICATIONS

International Search Report and Written Opinion, application PCT/EP2017/052287, dated Mar. 24, 2017.
(Continued)

*Primary Examiner* — Brian Gulledge
(74) *Attorney, Agent, or Firm* — Armstrong Teasdale LLP

(57) ABSTRACT

The present invention relates to a new process for the preparation of powdered microcapsules encapsulating active volatile active ingredients, in particular a perfume or a flavour, said process being performed at room temperature. Powdered microcapsules obtainable by said process are also an object of the invention. Perfuming and flavouring compositions as well as consumer products comprising said capsules are also part of the invention.

16 Claims, 7 Drawing Sheets

(51) Int. Cl.
    *A23L 27/00*    (2016.01)
    *A23L 29/212*   (2016.01)
    *A23L 29/30*    (2016.01)

(56)                References Cited

U.S. PATENT DOCUMENTS

| 2007/0104866 | A1* | 5/2007 | McClements | A23D 9/05 |
|---|---|---|---|---|
| | | | | 427/213.3 |
| 2008/0113018 | A1* | 5/2008 | Wieland | B01J 13/02 |
| | | | | 424/451 |
| 2008/0206325 | A1* | 8/2008 | Bouquerand | A61K 9/5073 |
| | | | | 424/463 |
| 2009/0252809 | A1* | 10/2009 | Galeone | A61K 8/37 |
| | | | | 424/497 |
| 2009/0253165 | A1 | 10/2009 | Dardelle et al. | |

FOREIGN PATENT DOCUMENTS

| WO | 2006131846 A1 | 12/2006 |
|---|---|---|
| WO | 2007026307 A2 | 3/2007 |
| WO | 2009153695 A1 | 12/2009 |
| WO | 2011154893 A1 | 12/2011 |
| WO | 2012122010 A2 | 9/2012 |
| WO | 2013128253 A1 | 9/2013 |
| WO | 2014044840 A1 | 3/2014 |

OTHER PUBLICATIONS

Berg et al., Influence of different pectins on powder characteristics of microencapsulated anthocyanins and their impact on drug retention of shellac coated granulate, Journal of Food Engineering, vol. 108, 2012, p. 158-165.

\* cited by examiner a)

b)

PROCESS FOR DRYING A SUSPENSION AT ROOM TEMPERATURE

This application is a 371 filing of International Patent Application PCT/EP2017/052287 filed 2 Feb. 2017, which claims the benefit of EP patent application 16153927.5, filed 2 Feb. 2016, the contents of which are hereby incorporated by reference in their entirety.

TECHNICAL FIELD

The present invention relates to a field of delivery systems. More particularly, the invention pertains to a process for the preparation of powdered microcapsules encapsulating active volatile ingredients, in particular a perfume or a flavour. The process of the invention provides an advantageous sustainable alternative to spray-drying as it takes place at room temperature. Powdered microcapsules obtainable by said process are also an object of the invention. Perfuming and flavouring compositions as well as consumer products comprising said capsules are also part of the invention.

BACKGROUND OF THE INVENTION

One of the problems faced by the perfume and flavour industry lies in the relatively rapid loss of olfactive benefit provided by active compounds due to their volatility, particularly that of "top-notes". The encapsulation of those active substances provides at the same time a protection of the ingredients there-encapsulated against "aggressions" such as oxidation or moisture and allows, on the other hand, a certain control of the kinetics of flavour or fragrance release to induce sensory effects through sequential release.

Spray-drying is part of the most common techniques used to stabilise volatile substances such as flavours and fragrances by encapsulating them in a solid form, suited to many applications. Spray-drying can be used to transform a simple emulsion into a powder, therefore providing an encapsulated system in the form of a matrix, but has also been described as a suitable technique to dry microencapsulated actives in the form of aqueous slurries, in particular core-shell systems. Spray-dried powders are commonly made by spraying liquid emulsions or slurries into a stream of hot air. Spray-drying is usually done by means of a rotating disc or of multicomponent nozzles. Detailed techniques are described for instance in K. Masters, Spray-drying Handbook, Longman Scientific and Technical 1991. This drying technique suffers from several drawbacks, the main one being the temperature at which the process is performed, which necessarily leads to volatile losses during the process. Another related problem is that of technical safety, the above-described encapsulation equipment suffering from explosions of particles suspended in the air. The problem of reducing the violence of possible explosion has therefore to be addressed, e.g. by using particular fireproofing agents in formulations.

Solutions to address the problem of reducing volatile losses during spray-drying have been described, among which spray-drying at lower temperatures. WO2012/122010 describes in particular a solution based on a modification of the equipment to have an inlet temperature of less than 100° C. and an air inlet dew point comprised between −10° C. and +5° C. in order to preserve volatiles during the process. However, besides the costs generated by the equipment, this process still generates volatile losses.

On the other hand, plating is a known technique that is performed at room temperature. It refers to the immobilisation of a liquid active onto a porous carrier. The liquid is either absorbed in the particles pores and/or capillary adsorbed in-between the particles thus leading to agglomeration. This technique is processed by mixing of both liquid and powder phases into a blender which makes it the most cost effective granulation method for oil delivery. However, plated flavours or perfumes are not properly encapsulated into a shell are therefore prone to evaporation and oxidation over storage, which limits the range of liquids that can be turned into powders by this technique to non-volatile and non-oxygen-sensitive compounds.

There is a need to find an alternative solution to existing drying techniques with the purpose of drying simple emulsions or slurries to form free-flowing powders while preserving the active volatiles to be encapsulated. The present invention solves this problem by providing a new process taking place at room temperature which allows to efficiently encapsulating an oil phase into a solidified carrier by powder blending with materials meeting certain criteria. Said process is producing unique microcapsules with a performance at least comparable to spray-dried powders.

SUMMARY OF THE INVENTION

It has now been found that the plating technique could be used not to immobilize a liquid active but to dry concentrated oil-in-water suspensions using a well-chosen desiccant powder in order to provide an efficient delivery system for active volatile ingredients. The process of the invention performed at room temperature therefore constitutes a solution to the above-mentioned problems as it allows preparing powdered microencapsulated systems while preserving the volatile ingredients there-encapsulated.

In a first aspect, the present invention relates to a process for preparing a powdered microencapsulated composition comprising the steps of:
a) Preparing an oil-in-water suspension containing
   (i) an oil phase comprising an active ingredient, preferably a perfume or a flavor, said oil being dispersed in
   (ii) an aqueous phase including water and a water-soluble carbohydrate carrier; and
   (iii) optionally an emulsifier;
   wherein weight ratio between the oil phase and the water is preferably above 1, more preferably above 1.5;
b) Blending at room temperature the suspension obtained under step a) with a desiccant powder to form a free-flowing microcapsule powder, said process being characterised in that the weight difference Δ between the water sorption of the desiccant and the water sorption of the carrier, at 50% relative humidity and at 25° C., is positive; preferably Δ is at least 1%, more preferably Δ is at least 2%.
c) Optionally sifting the obtained powder to remove the excess desiccant.

In a second aspect, the invention relates to non-spherical perfuming or flavouring powdered microcapsules, obtainable by a process as defined above. In a third aspect, the invention concerns a perfuming or flavouring composition comprising
   (i) non-spherical perfuming or flavouring powdered microcapsules as defined above;
   (ii) at least one perfuming or flavouring co-ingredient.

In a fourth and fifth aspects, the invention relates to a perfumed consumer products and flavoured edible products comprising the powdered microcapsules defined above.

DETAILED DESCRIPTION OF THE INVENTION

Figure 1:
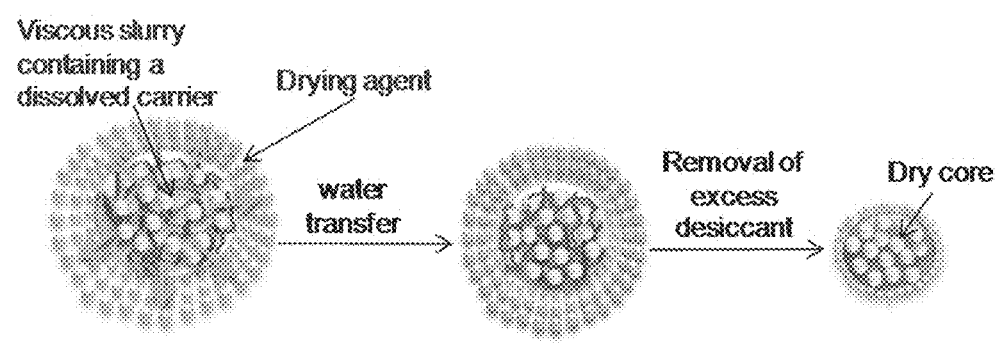
FIG. 1 is a schematic representation of the process according to the invention.

Unless stated otherwise, percentages (%) are meant to designate a percentage by weight of a composition.

By "room temperature" it is meant a temperature typically comprised between 20° C. and 30° C.

By "perfume or flavour oil", it is meant a single perfuming or flavouring compound or a mixture of several perfuming or flavouring compounds.

For the sake of clarity, the expression "suspension" in the present invention is meant to designate a system in which "particles" are dispersed in a continuous phase of a different composition and specifically includes a dispersion or an emulsion. For avoidance of doubt, a capsules slurry dispersed in a water phase falls under the definition of suspension, as well as "free" i.e. non-encapsulated oil dispersed in a water phase, but also a mixture thereof.

When referring to "water sorption" of a material in the context of the invention what is meant is the percentage of absorbed water by said dry material as a function of relative humidity in isothermic condition.

By "powdered" composition, what is meant is a dry composition.

By "non-spherical perfuming or flavouring powdered microcapsules", it should be understood powdered microcapsules having a coefficient of circularity below 0.70, preferably below 0.60. By contrast, particles obtained by spray-drying have a coefficient of circularity greater than 0.7.

The coefficient of circularity $f_{circ}$ is a well-known shape parameter and is function of the perimeter P and the area A of the particle (the circularity of a circle is 1):

$$f_{circ}=(4\pi A)/P^2$$

The present invention provides an advantageous alternative to spray-dried powders with a process involving no heating and performed at room temperature while still providing an efficient oil encapsulation.

The present invention therefore relates in a first aspect to a process for preparing a powdered microencapsulated composition comprising the steps of:

a) Preparing an oil-in-water suspension containing
  (i) an oil phase comprising an active ingredient, preferably a perfume or a flavor, said oil being dispersed in
  (ii) a water phase including a water-soluble carbohydrate carrier; and
  (iii) optionally an emulsifier
  wherein the ratio between the oil phase and the water is preferably above 1, more preferably above 1.5;
b) Blending at room temperature the suspension obtained under step a) with a desiccant powder to form a free-flowing microcapsule powder, said process being characterized in that weight difference Δ between the water sorption of the desiccant and the water sorption of the carrier, at 50% relative humidity and at 25° C., is positive; preferably Δ is at least 1%, more preferably Δ is at least 2%;
c) Optionally sifting the obtained powder to remove the excess desiccant.

According to the invention, the process described above is free of any spray-drying step.

Indeed, step b) of the process consists in drying the suspension obtained under step a) by blending at room temperature said suspension with a desiccant powder to form a free-flowing microcapsule powder, i.e a dry microcapsule powder.

The process according to the invention provides over traditional spray-drying the advantage of reducing possible volatile losses and respecting the initial liquid olfactory or flavour profile. It is also a way of reducing the production costs and carbon footprint, and it avoids explosion risks associated with drying liquids in hot air. It has been found that the presence of a water-soluble carrier in the dispersion which can act as a carrier upon drying to achieve a true encapsulation in a glassy matrix, together with specific respective water sorption isotherms of the carrier and the desiccant, were providing conditions such that the water migrates from the suspension to the desiccant during blending, allowing an efficient encapsulation.

In a first step of the process, an oil-in-water suspension is prepared. The oil phase comprises a hydrophobic active ingredient. According to a preferred embodiment, the active ingredient consists of a perfume or flavour. Alternative hydrophobic ingredients which could benefit from being encapsulated could be used either instead of a perfume or flavour, or in combination with a perfume or flavour. Non-limiting examples of such ingredients include a cosmetic, skin caring, malodour counteracting, bactericide, fungicide, pharmaceutical or agrochemical ingredient, a sanitizing agent, an insect repellent or attractant.

By "perfume oil" (or also "perfume") or "flavour" what is meant here is an ingredient or composition that is a liquid at about 20° C. Said perfume or flavour oil can be a perfuming or flavouring ingredient alone or a mixture of ingredients in the form of a perfuming or flavouring composition. As a "perfuming ingredient" it is meant here a compound, which is used in perfuming preparations or compositions to impart as primary purpose a hedonic effect. In other words such an ingredient, to be considered as being a perfuming one, must be recognized by a person skilled in the art as being able to at least impart or modify in a positive or pleasant way the odor of a composition, and not just as having an odor. The nature and type of the perfuming ingredients present in the oil phase do not warrant a more detailed description here, which in any case would not be exhaustive, the skilled person being able to select them on the basis of its general knowledge and according to intended use or application and the desired organoleptic effect. In general terms, these perfuming ingredients belong to chemical classes as varied as alcohols, aldehydes, ketones, esters, ethers, acetates, nitriles, terpenoids, nitrogenous or *sulphurous* heterocyclic compounds and essential oils, and said perfuming co-ingredients can be of natural or synthetic origin. Many of these co-ingredients are listed in reference texts such as the book by S. Arctander, Perfume and Flavor Chemicals, 1969, Montclair, N.J., USA, or its more recent versions, or in other works of a similar nature, as well as in the abundant patent literature in the field of perfumery. It is also understood that said ingredients may also be compounds known to release in a controlled manner various types of perfuming compounds.

The perfuming ingredients may be dissolved in a solvent of current use in the perfume industry. The solvent is preferably not an alcohol. Examples of such solvents are diethyl phthalate, isopropyl myristate, Abalyn® (rosin resins, available from Eastman), benzyl benzoate, ethyl citrate, limonene or other terpenes, or isoparaffins. Preferably, the solvent is very hydrophobic and highly sterically hindered, like for example Abalyn® or benzyl benzoate. Preferably the perfume comprises less than 30% of solvent. More preferably the perfume comprises less than 20% and even more preferably less than 10% of solvent, all these percentages being defined by weight relative to the total weight of the perfume. Most preferably, the perfume is essentially free of solvent.

By "flavour ingredient or composition" it is meant here a flavouring ingredient or a mixture of flavouring ingredients, solvent or adjuvants of current use for the preparation of a flavouring formulation, i.e. a particular mixture of ingredients which is intended to be added to an edible composition or chewable product to impart, improve or modify its organoleptic properties, in particular its flavour and/or taste. Taste modulator as also encompassed in said definition. Flavouring ingredients are well known to a skilled person in the art and their nature does not warrant a detailed description here, which in any case would not be exhaustive, the skilled flavourist being able to select them on the basis of his general knowledge and according to the intended use or application and the organoleptic effect it is desired to achieve. Many of these flavouring ingredients are listed in reference texts such as in the book by S. Arctander, Perfume and Flavor Chemicals, 1969, Montclair, N.J., USA, or its more recent versions, or in other works of similar nature such as Fenaroli's Handbook of Flavor Ingredients, 1975, CRC Press or Synthetic Food Adjuncts, 1947, by M. B. Jacobs, can Nostrand Co., Inc. Solvents and adjuvants or current use for the preparation of a flavouring formulation are also well known in the art.

In a particular embodiment, the flavour is selected from the group consisting of terpenic flavours including citrus and mint oil, and sulfury flavours.

According to any one of the invention's embodiment, the oil represents between about 10% and 60% w/w, or even between 20% and 50% w/w, by weight, relative to the total weight of the dispersion. Preferably, the weight ratio between the oil phase and the water is above 1, more preferably above 1.5.

According to one embodiment the perfume or flavour is in the form of a free oil dispersed in the water phase. What is meant by "free oil" in the context of the invention is an oil that is not encapsulated. According to a second embodiment, the perfume or flavour is in an encapsulated form dispersed in the water phase, i.e. in the form of a slurry. According to a third embodiment, the perfume or flavour is a mixture of free oil and encapsulated oil. When the suspension prepared in the first step of the invention comprises oil in an encapsulated form, the latter preferably consists of water-insoluble microcapsules. Those microcapsules can be obtained by any process known in the art and do not necessitate a more detailed description. As non-limiting examples, those water-insoluble microcapsules can be obtained by a process selected from the group consisting of interfacial polymerisation, polycondensation, simple and complex coacervation or a combination thereof. According to a particular embodiment the microcapsules have a core-shell structure with a polymeric shell. The nature of the polymeric shell from the microcapsules of the invention can vary. As non-limiting examples, the shell can be aminoplast-based, polyurea-based or polyurethane-based. The shell can also be hybrid, namely organic-inorganic such as a hybrid shell composed of at least two types of inorganic particles that are cross-linked, or yet a shell resulting from the hydrolysis and condensation reaction of a polyalkoxysilane macro-monomeric composition.

According to a particular embodiment, the shell comprises an aminoplast copolymer, such as melamine-formaldehyde or urea-formaldehyde or cross-linked melamine formaldehyde or melamine glyoxal.

According to another embodiment the shell is polyurea-based made from, for example but not limited to isocyanate-based monomers and amine-containing crosslinkers such as guanidine carbonate and/or guanazole. Preferred polyurea microcapsules comprise a polyurea wall which is the reaction product of the polymerisation between at least one polyisocyanate comprising at least two isocyanate functional groups and at least one reactant selected from the group consisting of a water soluble guanidine salt and guanidine; a colloidal stabilizer or emulsifier; and an encapsulated perfume.

According to another embodiment, the shell is polyurethane-based made from, for example but not limited to polyisocyanate and polyols, polyamide, polyester, etc.

According to another embodiment, the microcapsules have a polymeric shell resulting from complex coacervation wherein the shell is possibly cross-linked such as described in WO2014044840.

The oil phase is dispersed in a water phase including a water-soluble carbohydrate. Without being bound by theory, it is believed that the water-soluble carrier in the process according to the invention can act as a barrier upon drying to achieve a true encapsulation in a glassy matrix. Said water-soluble carrier is preferably present in an amount comprised between 25 wt % and 40 wt % of the suspension. According to one embodiment, the water-soluble carbohydrate carrier material consists of at least one emulsifying polymer with a number average molecular weight (Mn) below 3000 Dalton. According to another embodiment, the water-soluble carbohydrate carrier material comprises at least one starch hydrolysate with a molecular weight (Mn) lower than 1500 Dalton, and the suspension further comprises an emulsifier. Typical emulsifiers include lecithin, glycerol esters, fatty acid esters, saponins, proteins, gum Arabic and mixtures thereof. According to a particular embodiment, the water-soluble carbohydrate carrier material is a modified starch or octenylsuccinated starch.

In a second step of the process of the invention, the suspension obtained under step a) is blended at room temperature with a desiccant powder to form a free-flowing powder. The desiccant is such that the weight difference Δ between the water sorption of said desiccant and the water sorption of the carrier, at 50% relative humidity (RH) and 25° C. is positive. According to a preferred embodiment, Δ is of at least 1%, more preferably of at least 2%.

Water sorption isotherms can be easily measured by using Dynamic Vapor Sorption equipment (Surface Measurement Systems Ltd, Alperton London, UK). Amorphous biopolymers exhibit a S-shaped water sorption isotherm which follows the model developed by Guggheim-Anderson-de Boer (GAB's model). This technique is very popular and recommend: "H. Bizot, Using the GAB model to construct sorption isotherms, in: R. Jowitt, et al. (Eds.), Physical Properties of Foods (European Project Group COST 90 on physical properties of foods), Applied Science Publishers, London, 1983, p. 43.

The sorption isotherm is well described by the GAB empirical model (Anderson 1946; Guggenheim 1966; de Boer 1968; van den Berg 1981), where $X_w$ is the water content on a dry basis and $X_m$, K and C are temperature dependent empirical constants whereas $a_w$ is the water activity:

$$X_W = \frac{[W]}{1-[W]} = \frac{X_m K C a_W}{(1-Ka_W)(1-Ka_W+KCa_W)}$$

The desiccant is preferably used in an amount such that weight ratio between the desiccant and the liquid suspension is comprised between 1 and 9.

Examples of desiccant suitable for the invention include maltodextrin, starch, polyvinyl acetate, polyvinyl alcohol, dextrines, natural or modified starches, vegetable gums, pectins, xanthanes, alginates, carrageenans, cellulose derivatives, gelatines and mixtures thereof.

The person skilled in the art will be able to select a suitable carrier and a suitable desiccant to have a weight difference Δ between the water sorption of the desiccant and the water sorption of the carrier, at 50% relative humidity and at 25° C. that is positive.

According to one embodiment of the process of the invention, the obtained free flowing powder is then sifted. Different sieves characterised by different mesh sizes can be used. As an example, sieves with mesh size 1400/800/500/200 μm can be used in the context of the invention.

According to any of the above-described embodiments, a flowing agent can be used in the process of the invention. The flowing agent can ease the separation between the formed microcapsules and the desiccant used to dry the emulsion when there is a sifting step. It can also be used to improve the flowability of the resulting powders in the absence of sifting step. Typical examples of flowing agent include those selected from the group consisting of silicate, rice hull fibers, tricalcium phosphate and magnesium stearate.

Figure 2:
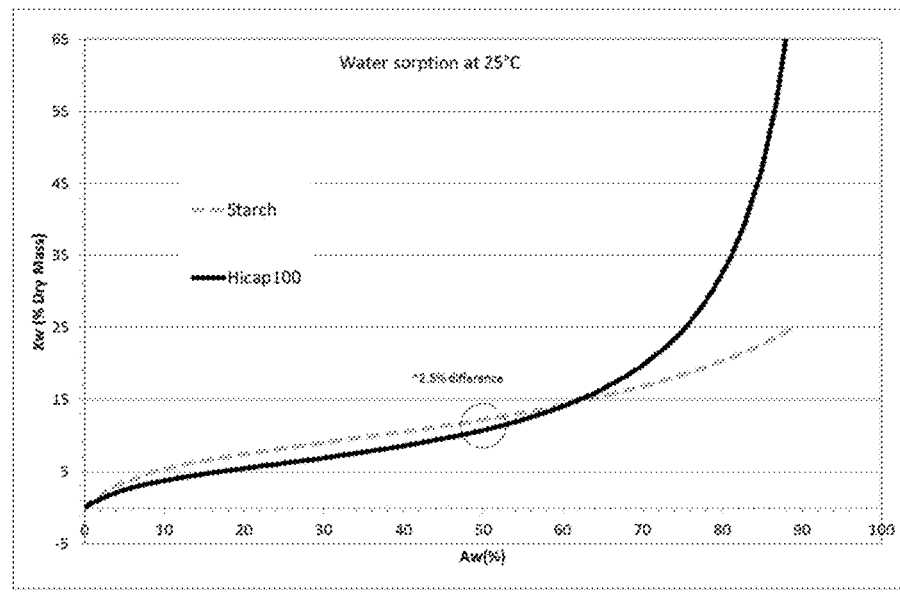
FIG. 2 represents water sorptions of native starch, respectively Hi-Cap®.
Figure 3:
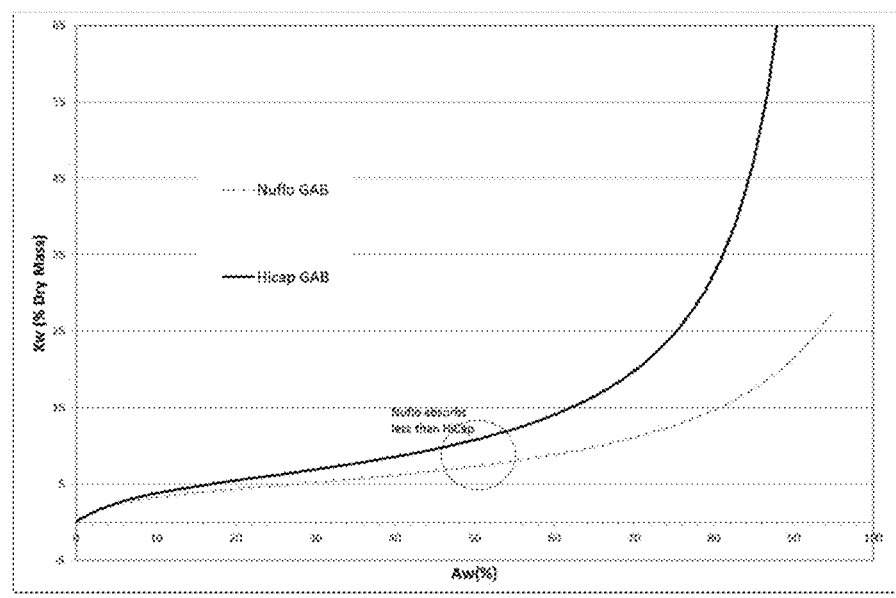
FIG. 3 shows water sorptions of Nu-Flow, respectively Hi-Cap®

A second object of the invention consist of non-spherical perfuming or flavouring powdered microcapsules obtainable by a process as described in any of the above-described embodiments FIG. 2 is illustrating the non-spherical nature of the products from the invention on two different fractions, which is a unique characteristic that distinguishes the products of the invention from microcapsules obtained by a spray-drying process which are spherical as shown in FIG. 3. The obtained product has, according to a first embodiment, a matrix structure, when an emulsion of free oil is dried by the process according to the invention. According to a second embodiment, it takes the form of dried core-shell microcapsules. According to a third embodiment, the powder consists of a combination of both in a matrix of carbohydrate material.

The microcapsules according to the invention, present an advantageous alternative to spray-dried powder as they ensure an optimal preservation of the profile from the perfume or flavour there-encapsulated.

Such microcapsules could also be prepared with any other hydrophobic active material as mentioned above.

The products of the invention can be used for the preparation of perfuming or flavouring compositions which are also an object of the invention.

In particular a perfuming composition comprising (i) non-spherical perfuming powdered microcapsules as defined above; (ii) at least one perfuming co-ingredient; and (iii) optionally a perfumery adjuvant, is another object of the invention.

By "perfuming co-ingredient" it is meant here a compound, which is used in a perfuming preparation or a composition to impart a hedonic effect and which is not a microcapsule as defined above. In other words such a co-ingredient, to be considered as being a perfuming one, must be recognized by a person skilled in the art as being able to impart or modify in a positive or pleasant way the odor of a composition, and not just as having an odor. The nature and type of the perfuming co-ingredients present in the perfuming composition do not warrant a more detailed description here, which in any case would not be exhaustive, the skilled person being able to select them on the basis of his general knowledge and according to the intended use or application and the desired organoleptic effect. In general terms, these perfuming co-ingredients belong to chemical classes as varied as alcohols, lactones, aldehydes, ketones, esters, ethers, acetates, nitriles, terpenoids, nitrogenous or *sulphurous* heterocyclic compounds and essential oils, and said perfuming co-ingredients can be of natural or synthetic origin. Many of these co-ingredients are in any case listed in reference texts such as the book by S. Arctander, Perfume and Flavor Chemicals, 1969, Montclair, N.J., USA, or its more recent versions, or in other works of a similar nature, as well as in the abundant patent literature in the field of perfumery. It is also understood that said co-ingredients may also be compounds known to release in a controlled manner various types of perfuming compounds.

By "perfumery adjuvant" we mean here an ingredient capable of imparting additional added benefit such as a color, a particular light resistance, chemical stability, etc. A detailed description of the nature and type of adjuvant commonly used in perfuming bases cannot be exhaustive, but it has to be mentioned that said ingredients are well known to a person skilled in the art.

Preferably, the perfuming composition according to the invention comprises between 0.1 and 30% by weight of microcapsules as defined above.

The invention's microcapsules can advantageously be used in all the fields of modern perfumery. Consequently, another object of the present invention is represented by a perfuming consumer product comprising as a perfuming ingredient, the microcapsules defined above or a perfuming composition as defined above.

The invention's microcapsules can therefore be added as such or as part of an invention's perfuming composition in a perfuming consumer product.

For the sake of clarity, it has to be mentioned that, by "perfuming consumer product" it is meant a consumer product which is expected to deliver at least a pleasant perfuming effect to the surface to which it is applied (e.g. skin, hair, textile, or home surface). In other words, a perfuming consumer product according to the invention is a perfumed consumer product which comprises a functional formulation, as well as optionally additional benefit agents, corresponding to the desired consumer product, e.g. a detergent or an air freshener, and an olfactive effective amount of at least one invention's compound.

The nature and type of the constituents of the perfumery consumer product do not warrant a more detailed description here, which in any case would not be exhaustive, the skilled person being able to select them on the basis of his general knowledge and according to the nature and the desired effect of said product. Formulations of consumer products in which the microcapsules of the invention can be incorporated can be found in the abundant literature relative to such products. These formulations do not warrant a detailed description here which would in any case not be exhaustive. The person skilled in the art of formulating such consumer products is perfectly able to select the suitable components on the basis of his general knowledge and of the available literature.

Non-limiting examples of suitable perfumery consumer product can be a perfume, such as a fine perfume, a cologne or an after-shave lotion; a fabric care product, such as a detergent, tablets and pods, a fabric softener, a dryer sheet, a fabric refresher, an ironing water, or a bleach; a body-care product, such as a hair care product (e.g. a shampoo, hair conditioner, a colouring preparation or a hair spray), a cosmetic preparation (e.g. a vanishing cream, body lotion or a deodorant or antiperspirant), or a skin-care product (e.g. a perfumed soap, shower or bath mousse, body wash, oil or gel, bath salts, or a to hygiene product); an air care product, such as an air freshener or a "ready to use" powdered air freshener; or a home care product, such all-purpose cleaners, liquid or power or tablet dishwashing products, toilet cleaners or products for cleaning various surfaces.

Preferably, the perfuming consumer product comprises from 0.1 to 15 wt %, more preferably between 0.2 and 5 wt % of the microcapsules of the present invention, these percentages being defined by weight relative to the total weight of the consumer product. Of course the above concentrations may be adapted according to the olfactive effect desired in each product.

The microcapsules of the invention when encapsulating a flavour, can also be used in a great variety of edible end products. Consumer products susceptible of being flavoured by the microcapsules of the invention may include foods, beverages, pharmaceutical and the like. For example foodstuff base that could use the powdered microcapsules of the invention include Baked goods (e.g. bread, dry biscuits, cakes, other baked goods), Non-alcoholic beverages (e.g. carbonated soft drinks, bottled waters, sports/energy drinks, juice drinks, vegetable juices, vegetable juice preparations), Alcoholic beverages (e.g. beer and malt beverages, spirituous beverages), Instant beverages (e.g. instant vegetable drinks, powdered soft drinks, instant coffee and tea), Cereal products (e.g. breakfast cereals, pre-cooked ready-made rice products, rice flour products, millet and sorghum products, raw or pre-cooked noodles and pasta products), Milk products (e.g. fresh cheese, soft cheese, hard cheese, milk drinks, whey, butter, partially or wholly hydrolysed milk protein-containing products, fermented milk products, condensed milk and analogues), Dairy based products (e.g. fruit or flavored yoghurt, ice cream, fruit ices)

Confectionary products (e.g. chewing gum, hard and soft candy)

Chocolate and compound coatings

Products based on fat and oil or emulsions thereof (e.g. mayonnaise, spreads, margarines, shortenings, remoulade, dressings, spice preparations), Spiced, marinated or processed fish products (e.g. fish sausage, surimi), Eggs or egg products (dried egg, egg white, egg yolk, custard), Desserts (e.g. gelatins and puddings)

Products made of soya protein or other soya bean fractions (e.g. soya milk and products made therefrom, soya lecithin-containing preparations, fermented products such as tofu or tempeh or products manufactured therefrom, soya sauces), Vegetable preparations (e.g. ketchup, sauces, processed and reconstituted vegetables, dried vegetables, deep frozen vegetables, pre-cooked vegetables, vegetables pickled in vinegar, vegetable concentrates or pastes, cooked vegetables, potato preparations), Vegetarian meat replacer, vegetarian burger Spices or spice preparations (e.g. mustard preparations, horseradish preparations), spice mixtures and, in particular seasonings which are used, for example, in the field of snacks.

Snack articles (e.g. baked or fried potato crisps or potato dough products, bread dough products, extrudates based on maize, rice or ground nuts), Meat products (e.g. processed meat, poultry, beef, pork, ham, fresh sausage or raw meat preparations, spiced or marinated fresh meat or cured meat products, reformed meat), Ready dishes (e.g. instant noodles, rice, pasta, pizza, tortillas, wraps) and soups and broths (e.g. stock, savory cube, dried soups, instant soups, pre-cooked soups, retorted soups), sauces (instant sauces, dried sauces, ready-made sauces, gravies, sweet sauces).

Preferably, the microcapsules according to the invention shall be used in products selected from the group consisting of baked goods, instant beverages, cereal products, milk products, dairy-based products, products based on fat and oil or emulsions thereof, desserts, vegetable preparations, vegetarian meat replacer, spices and seasonings, snacks, meat products, ready dishes, soups and broths and sauces.

The invention will now be further described by way of examples. It will be appreciated that the invention as claimed is not intended to be limited in any way by these examples.

EXAMPLES

Example 1

Preparation of a Microencapsulated Powder According to the Invention Based on a Flavour Emulsion A pre-emulsion was made using a simple blade mixer. This pre-emulsion was further processed with a colloïd mill (Fryma). The emulsion was made of 50% lemon flavour (51124A; origin: Firmenich SA)+25% modified starch (Hi-Cap®, trademark and origin from Ingredion Ltd Manchester UK)+25% water.

As desiccant, native starch was used.

FIG. 2 shows water sorption of native starch, respectively Hi-Cap®. At 50% RH A (water sorption native starch—water sorption Hi-Cap®) is positive.

The native starch was dried in an oven before use. Its final moisture content was 4.1 wt %. 500 g of native starch were transferred in a bowl mixer and 107.7 g of the above emulsion were added while blending, using a large syringe. The resulting blend contained 17.7% wt of the emulsion corresponding to 8.9% wt of flavour. 1 g of silica gel flatting agent (Syloid 244FP, origin Grace) and 1 g of silica-based flowing agent (Sipernat® 2000, trademark from Evonik induties) were dispersed into 200 g of the blend and sifted through 4 different sieves with mesh size 1400/800/500/200 µm. The obtained fractions are listed and described in Table 1.

TABLE 1

Example 1

| Fraction | Mass | Distribution | % flavour by LF-NMR | % water by LF-NMR |
|---|---|---|---|---|
| >1400 µm | 0 g | 0% | — | — |
| 800-1400 µm | 0 g | 0% | — | — |
| 500-800 µm | 1.95 g | 1% | 30.85 | 5.34 |
| 200-500 µm | 33 g | 18.2% | 25.45 | 5.42 |
| <200 µm | 146 g | 80.7% | 2.82 | 6.85 |

The bottom fraction being mainly starch was considered as a waste product which might be recycled. The two fractions between 200 and 800 µm gave a very nice, dust free, free-flowing and high-loaded powder.

Example 2

Comparative Example: Preparation of a Microencapsulated Powder Based on a Flavour Emulsion Outside the Scope of the Invention Nu-FLOW® (trademark from Ribus Cie) is a natural flowing agent from Ribus Cie containing 4.4% moisture stored in dry conditions. This material was chosen as desiccant. 130 g of the emulsion used in Example 1 were dispersed with a syringe in 500 g of Nu-FLOW® powder in a bowl-mixer for few minutes. The resulting blend composition was then: 5.2% Hi-Cap®+5.2% added water+10.3% lemon oil+79.3% Nu-FLOW®. 250 g of this blend were mixed with 1 g of Sipernat® 2000 and sifted through 4 different sieves with mesh size 1400/800/500/200 µm.

FIG. 3 shows water sorptions of Nu-Flow, respectively Hi-Cap®. At 50% RH A (water sorption Nu-FLOW®—water sorption Hi-Cap®) is negative.

The obtained fractions are described in Table 2.

TABLE 2

| Fraction | Mass | Distribution | % flavor by LF-NMR | % water by LF-NMR |
|---|---|---|---|---|
| >1400 µm | 1 g | 0.4% | — | — |
| 800-1400 µm | 3.3 g | 1.4% | 9.12 | 8.08 |
| 500-800 µm | 37.8 g | 15.8% | 13.95 | 7.74 |
| 200-500 µm | 131 g | 54.5% | 7.76 | 8.31 |
| <200 µm | 67 g | 27.9% | 6.87 | 7.94 |

The LF-NMR analysis of the whole sample gave a flavour load of 7.74% wt whereas it actually contains 10.3% wt. This decay of about 25% of the value confirms the special interaction already noticed. Even if the fraction between 500-800 µm seems to be richer in flavour than the initial blend, the water content remains identical for all the fractions. As a conclusion Nu-FLOW® as a desiccant was able to turn an emulsion into a powder but not to dry it by contrast with starch in example 1.

Example 3

Process According to the Invention to Dry at RT a Perfume Microcapsule Slurry

The process according to the invention was applied to a viscous slurry of perfume microcapsules.

a) Preparation of a Suspensions Containing Oil in the Form of Perfume Microcapsules Made by Interfacial Polymerisation Polyurea core-shell microcapsules were prepared following the process described in WO2009153695, using a model perfume as the microcapsules' core.

The obtained slurry of microcapsules was dispersed in water containing as hydrated carrier material Hi-Cap®. The ratio between the encapsulated oil and water was 3.4. The system obtained consisted of a stabilized suspension.

About 43 g of suspension obtained under step a) were centrifuged at 4000 rpm during 10 min to remove the excess of water.

b) Blending Step

About 20 g of a thick paste of capsules was recovered and transferred in a bowl mixer containing 80 g of native starch (desiccant) having a water content of 5.1%+0.7 g of Sipemat® (flowing agent). According to TGA measurement the paste contained approximately 22% water which corresponds to 74% of perfume.

After 20 seconds of mixing, the resulting blend was sifted for 5 min at maximum amplitude giving the following fractions described in Table 3.

TABLE 3

| Fraction | Mass | Distribution | % perfume by LF-NMR | % water by LF-NMR |
|---|---|---|---|---|
| >1400 µm | 7.7 g | 8.5% | 69.9 | 3.2 |
| 800-1400 µm | 7.7 g | 8.5% | 58.1 | 4.23 |
| 500-800 µm | 46.2 g | 51% | 4.2 | 8.55 |
| 200-500 µm | 27.3 g | 30.1% | 1.8 | 8.89 |
| <200 µm | 1.7 g | 1.9% | — | — |

In this case the segregation was very efficient as the large particles contained more than 50% perfume whereas the lower fraction contained less than 5%. The slurry was effectively dried by the process according to the invention.

Example 4

Particles Obtained by a Process According to the Invention with Maltodextrin as Desiccant Particles according to the invention were obtained as described below:

A pre-emulsion was prepared by mixing an orange flavour with a 50/50 w/w Hi-Cap/water solution, using a mechanical empeller. This pre-emulsion was further processed with a colloïd mill (Fryma). The composition of the final emulsion is orange oil/Hi-Cap/water 50/25/25 (w/w/w).

2DE maltodextrin was used as desiccant, and was dried in an oven at 80° C. beforehand. Its final moisture content was 4.4 wt %. 210 g of dried 2DE maltodextrin were transferred into a bowl mixer and 53 g of the above emulsion were added while blending, using a large syringe. 2 g of silicon dioxide were added at the end of the blending step to improve flowability. Therefore, the average flavour content in the powder is 10 wt %. Finally, the blend was sifted through 5 different sieves with mesh size 1400/1250/800/500/200 μm. The following fractions were obtained:

Example 4

| Fraction | Mass (g) | Distribution (%) | % flavor by LF-NMR | % water by LF-NMR |
|---|---|---|---|---|
| >1400 μm | 2.63 | 0.8 | 24.2 | 6.57 |
| 1250-1400 μm | 0.24 | 0.1 | 25.8 | 5.99 |
| 800-1400 μm | 10.79 | 3.3 | 26.3 | 6.04 |
| 500-800 μm | 34.14 | 10.4 | 24.0 | 6.08 |
| 200-500 μm | 77.78 | 23.7 | 11.3 | 6.84 |
| <200 μm | 202.8 | 61.8 | 1.9 | 7.90 |

It was observed that a segregation of the oil took place during the drying process, enriching the large particles (oil content >10 wt %). As for the fraction of size <200 μm (free desiccant powder to possibly be recycled), it was observed that it is the one with the higher water content and the lower flavour content. These different distribution profiles of flavour and water highlight the successful drying ability of the desiccant by this process.

Figure 4:
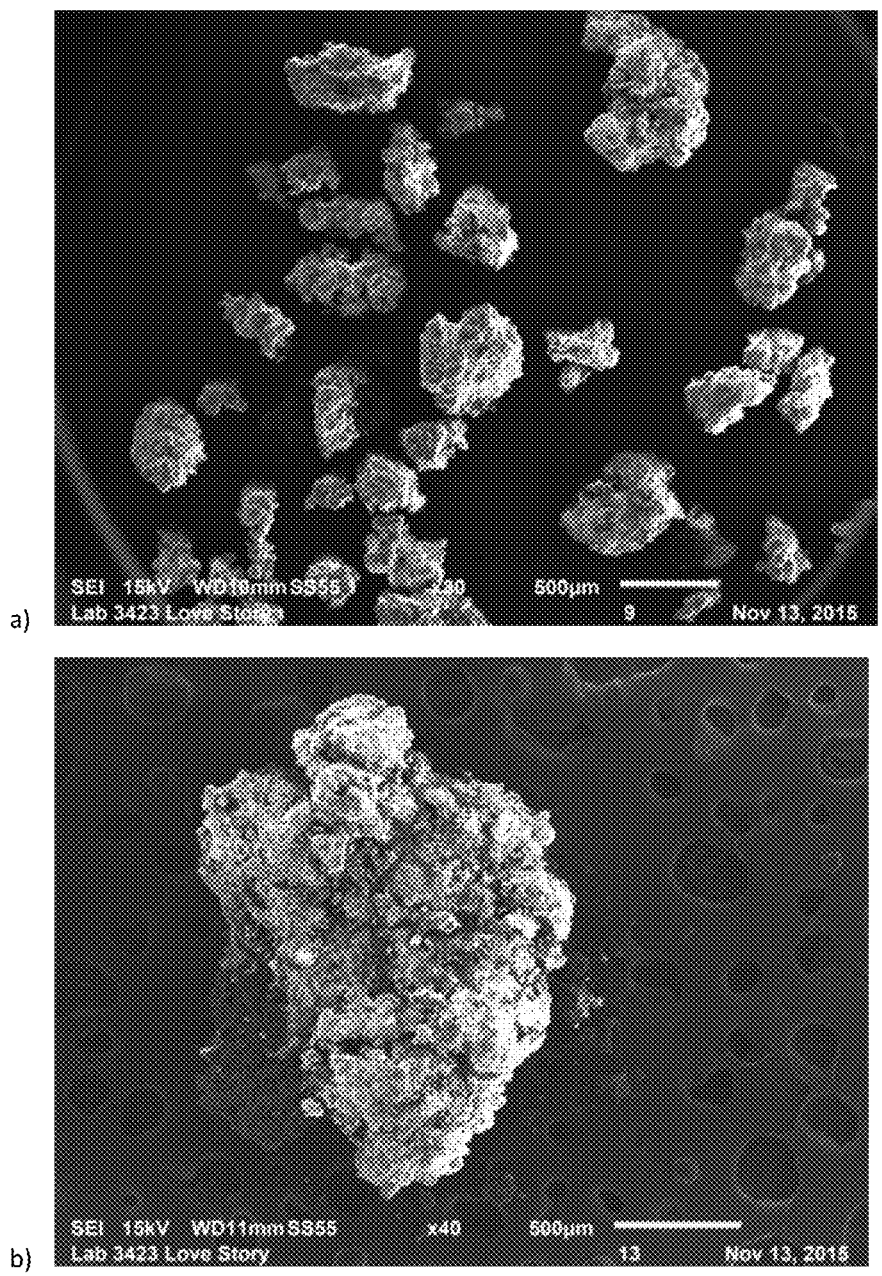
FIG. 4 is a SEM picture of powdered microcapsules described in example 4; a) being the fraction 200-500 µm and b) the fraction 1250-1400 µm.
Figure 5:
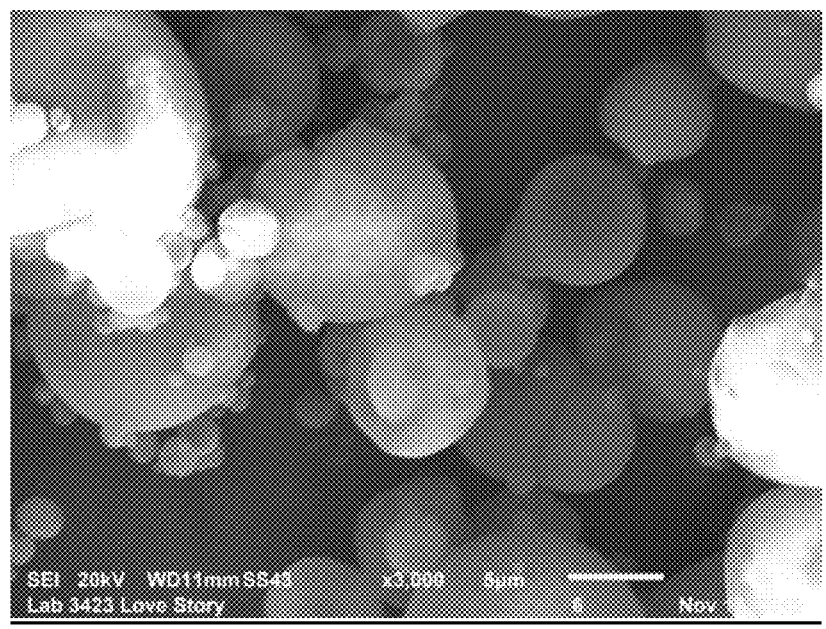
FIG. 5 is a SEM picture of a spray-dried emulsion.

FIG. 4 is SEM picture of the obtained particles, respectively a) fraction 200-500 μm and b) 1250-1400 μm. It is observed that the particles are non-spherical with a rough surface. For purpose of comparison, FIG. 5 is a SEM picture of a spray-dried powder showing particles that are smooth and spherical.

Example 5

Particles Obtained by a Process According to the Invention Applied to a Combination of Free Perfume and Microencapsulated Perfume (Melamine-Formaldehyde)

Particles according to the invention were obtained as described below:

A free perfume was emulsified with Hi-Cap in a suspension of melamine microcapsules obtained according to the patent WO2006131846 (suspension containing 35 wt % microcapsules). The final suspension contained 50 wt % microcapsules suspension, 17 wt % free perfume, 33 wt % Hi-cap. After all the ingredients were mixed, the emulsion was prepared using a mechanical empeller.

Then, 210 g of dried 2DE maltodextrin were transferred into a cutter blender followed by 53 g of the above suspension. The two phases were blended for 30 seconds until homogenization, before adding 2 g of silicon dioxide flowing agent and mixing again before sifting.

The blend was sifted through 6 sieves of mesh size 1400/1250/800/500/200/100 μm. The following fractions were obtained:

Example 5

| Fraction | Mass (g) | Distribution (%) | % perfume by LF-NMR | % water by LF-NMR |
|---|---|---|---|---|
| >1400 μm | 7.1 | 2.8% | 17.57% | 8.75 |
| 1250-1400 μm | 2.3 | 0.9% | 16.95% | 7.12 |
| 800-1400 μm | 16.8 | 6.5% | 18.87% | 6.84 |
| 500-800 μm | 24.1 | 9.4% | 17.13% | 6.37 |
| 200-500 μm | 40.1 | 15.6% | 7.08% | 6.56 |
| 100-200 μm | 78.6 | 30.6% | 0.64% | 7.07 |
| <100 μm | 87.7 | 34.2% | 0.42% | 7.59 |

For performance comparison, a non-sifted blend of suspension dried with maltodextrin 2DE was prepared:

180 g of 2DE maltodextrin dried in an oven at 80° C. were transferred into a cutter blender followed by 120 g of the above suspension (60 wt % desiccant and 40 wt % suspension). The two phases were blended for 30 seconds until homogenization, before adding 2 g of silicon dioxide flowing agent.

A nice flowable powder was obtained. Low-filed NMR measurements enabled to determine the perfume content (10.2 wt %) and the water content (14.1 wt %) of the powder.

Example 6A

Particles Obtained by a Process According to the Invention Applied to a Suspension of Microcapsules Obtained by Coacervation a) Preparation of a Suspension Containing Oil in the Form of Perfume Microcapsules Made by Complex Coacervation.

Core-shell microcapsules based on complex coacervation were obtained following state of the art processes described in US 20090253165, example 1, using a model perfume as the microcapsules' core.

The obtained slurry is a suspension of microcapsules in water containing 45% perfume and 45% water, at that stage the ratio between the encapsulated oil and water was 1. The carrier material (Hi-Cap®) is then added to the capsule suspension to reach a concentration of 50% into the water phase and mix until complete solubilisation. The final system obtained consisted of a stabilized suspension.

b) Blending Step

The prepared capsule suspension was recovered and transferred in a cutter blender containing native starch (desiccant) having a water content of 5.1% and optionally 0.1% of a flowing agent (Sipernat®).

The mixture desiccant+capsules suspension was then mixed during 1 min to allow a complete homogenization. The mixture was then transferred into a sifting tower and sifted for 5 min at maximum amplitude to eliminate agglomerates above 1700 μm and recover the desiccant below 100 μm.

The resulting product is a free flowing powder.

Example 6B

Particles Obtained by a Process According to the Invention Applied to Suspension of Composite Microcapsules a) preparation of a suspensions containing oil in the form of perfume composite microcapsules. Composite Core-shell microcapsules were obtained following the process described in (Multilayered core-shell microcapsules—EP2897723, example 4) using a model perfume as the microcapsules' core.

The obtained slurry is a suspension of microcapsules in water containing 45% perfume and 45% water, at that stage the ratio between the encapsulated oil and water was 1. The carrier material (Hi-Cap®) is then poor into the capsule suspension to reach a concentration of 50% into the water phase and mix until complete solubilisation. The final system obtained consisted of a stabilized suspension.

b) Blending step

The prepared capsule suspension was recovered and transferred in a cutter blender containing native starch (desiccant) having a water content of 5.1% and optionally 0.1% of a flowing agent (Sipernat®).

The mixture desiccant+capsule suspension was then mixed during 1 min to allow a complete homogenization. The mixture was then transferred into a sifting tower and sifted for 5 min at maximum amplitude to eliminate agglomerates above 1700 um and recover the desiccant below 100 um.

The resulting product is a free flowing powder.

Example 6C

Particles Obtained by a Process According to the Invention Applied to a Combination of Free Perfume and Microencapsulated Perfume (Microcapsule Obtained by Coacervation)

a) Preparation of a Suspensions Containing a Combination of Free Oil and Oil in the Form of Perfume Microcapsules Made by Complex Coacervation.

Core-shell microcapsules based on complex coacervation were obtained following state of the art processes described in US 20090253165, example 1, using a model perfume as the microcapsules' core.

The obtained slurry is a suspension of microcapsules in water containing 45% perfume and 45% water. The carrier material (Hi-Cap®) is then poor into the capsule suspension to reach a concentration of 50% into the water phase and mix until complete solubilisation. A free perfume was then introduce and emulsified into the microcapsule suspension using a mechanical impeller. The final system obtained consisted of a stabilized suspension of microcapsule and free oil.

b) Blending Step

The prepared suspension was recovered and transferred in a cutter blender containing 2DE maltodextrin (desiccant) and optionally 0.1% of a flowing agent (Sipernat®). The mixture desiccant+capsule suspension was then mixed during 1 min to allow a complete homogenization. The mixture was then transferred into a sifting tower and sifted for 5 min at maximum amplitude to eliminate agglomerates above 1700 um and recover the desiccant below 100 um.

The resulting product is a free flowing powder.

Example 6D

Particles Obtained by a Process According to the Invention Applied to a Combination of Free Perfume and Microencapsulated Perfume (Composite Microcapsule).

a) Preparation of a Suspensions Containing a Combination of Free Oil and Oil in the Form of Perfume Composite Microcapsules.

Composite Core-shell microcapsules were obtained following the process described in (Multilayered core-shell microcapsules—EP2897723, example 4) using a model perfume as the microcapsules' core.

The obtained slurry is a suspension of microcapsules in water containing 45% perfume and 45% water. The carrier material (Hi-Cap®) is then poor into the capsule suspension to reach a concentration of 50% into the water phase and mix until complete solubilisation. A free perfume was then introduce and emulsified into the microcapsule suspension using a mechanical impeller. The final system obtained consisted of a stabilized suspension of microcapsule and free oil.

b) Blending Step

The prepared suspension was recovered and transferred in a cutter blender containing 2DE maltodextrin (desiccant) and optionally 0.1% of a flowing agent (Sipernat®). The mixture dessicant+capsule suspension was then mixed during 1 min to allow a complete homogenization. The mixture was then transferred into a sifting tower and sifted for 5 min at maximum amplitude to eliminate agglomerates above 1700 um and recover the dessicant below 100 um.

The resulting product is a free flowing powder.

Example 7

Performance of Particles According to the Invention in a Powder Detergent

Dry powder as described in example 5 was used in two forms

1) Non-sifted blend
2) Sifted blend and selection of fraction 500-800 μm

A control powder was prepared by spray-drying a suspension containing free perfume and melamine-formaldehyde slurry (same as described in example 5).

TABLE 4

| Suspension composition | |
|---|---|
| Ingredient | Weight (%) |
| Melamine formaldehyde microcapsules slurry | 50 |
| Free perfume | 17 |
| Carrier | 33 |

Protocol:

2 kg of cotton laundry (20 towels and 4 ballasts) were washed in a Miele Novotronic W 900-79 Ch washing machine (40° C. short cycle without pre-wash at 900 rpm, followed by 2 rinsing cycles). 100 g powder detergent (classic formula for washing machine) containing the perfumed compositions described in the present invention were used.

The perfumed powder detergents tested are described below:

A—Powder detergent with 1.70% sifted blend (0.21% microcapsules, 0.15% free oil)
B—Powder detergent with 2.78% non-sifted blend (0.21% microcapsules, 0.15% free oil)
C—Powder detergent with 0.72% spray dried suspension (0.14% microcapsules, 0.15% free oil)
D—Powder detergent with 1.06% spray dried suspension (0.21% microcapsules, 0.22% free oil)

After the washing, the laundry was dried for 24 hours.

A sensory panel was performed with 17 Panellists that were asked to rate the perfume intensity on dry towels before and after rubbing using a scale between 1 (non perceptible perfume) and 7 (very strong perfume intensity).

The panels' results were then analysed with a 95% confidence interval (or 90% if needed) and variance was calculated using Duncan's post-hoc analysis ($\alpha=0.05$).

Figure 6:
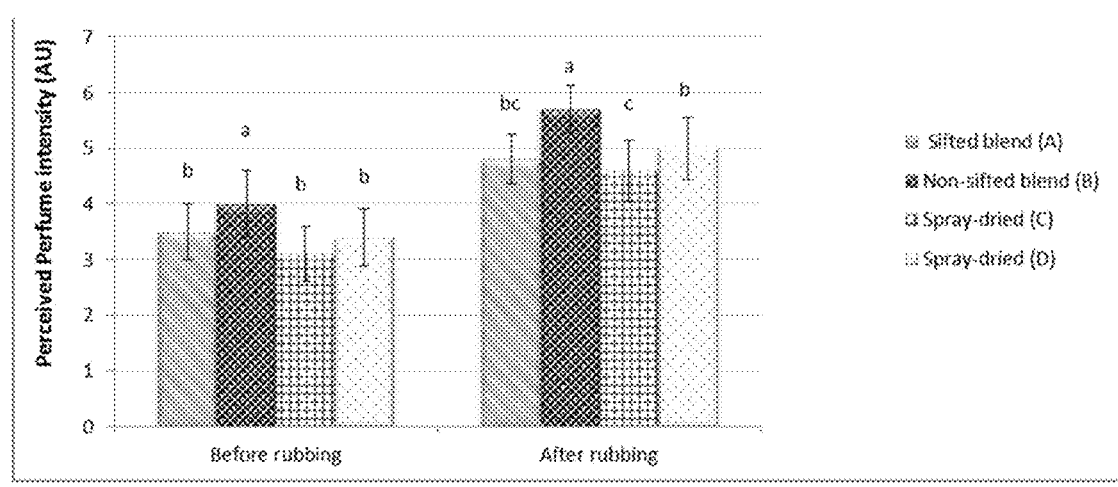
FIG. 6 illustrates a comparison of the perfume intensity on dry laundry between a powder according to the invention and a capsules slurry that has been spray-dried.

Results are displayed in FIG. 6.

Example 8

Performance of Particles According to the Invention in a Chicken Bouillon, Comparisons Between Different Processes The same chicken flavor (Boiled Chicken Top Note 310114 00803TH, origin: Firmenich) was transformed into dry powders using different processes.

A 50/25/25 chicken flavor/Hi-Cap®/water emulsion was dried according to the process of the invention onto 80% maltodextrin 2DE and then sifted to obtain 3 different fractions (200-500 µm, 500-800 µm and >800 µm).

Alternatively, 20% of the same chicken flavor was plated on 80% of maltodextrin 4-8DE by strong mixing in a blender (standard plating on maltodextrin) (control 1)

Similarly, 5.4% of the chicken flavor was plated on 94.6% of sodium chloride (standard plating on salt) (control 2)

Finally, the chicken flavor was spray dried on maltodextrin (spray dried powder) (control 3)

All 7 flavors were first evaluated in blind by 6 expert panelists, in water in a first session and in a chicken bouillon in a second session, at iso-active load. The dosages are provided in Table 5.

TABLE 5

Ready-To-Consume dosages of all flavor systems to achieve iso-active load

|  | Dosage (%) |
| --- | --- |
| Liquid Chicken flavor | 0.008 |
| Spray Dried Chicken | 0.042 |
| Standard Plating on maltodextrin | 0.040 |
| Standard Plating on salt | 0.160 |
| Drying according to invention Emulsion viscous 2DE (200-500 µm) | 0.075 |
| Drying according to invention Emulsion viscous 2DE (500-800 µm) | 0.034 |
| Drying according to invention Emulsion viscous 2DE (>800 µm) | 0.032 |

1—Sensory Evaluation

All 7 flavors were first evaluated in blind by 6 expert panellists, in water in a first session and in a chicken bouillon in a second session.

The chicken stock was prepared containing the following ingredients:

TABLE 6

|  | Amount (% w/w) |
| --- | --- |
| Chicken meat powder | 2.5 |
| Maltodextrin | 34.2 |
| Garlic Powder | 0.5 |
| Beaded Palm Oil | 5 |
| Ground White Pepper | 0.3 |
| Yeast extract | 10 |
| Onion Powder | 3.25 |
| Toasted Onion Powder | 2 |
| Turmeric | 0.25 |
| Monosodium Glutamate | 2 |
| Salt | 35 |
| Chicken fat | 5 |

10 g of chicken stock was poured in 500 ml of boiling water. All flavors were added to the chicken bouillon at the dosages indicated in Table 5.

The panellists were asked to rate the aroma and the flavor intensities and to describe what they perceive. The results in water are presented in Table 7. The results in the chicken bouillon are presented in Table 8.

TABLE 7

Averaged aroma and flavor intensity of 7 flavor systems in water and comments cited by panellists

| | Aroma Intensity | Flavor Intensity | Comments |
| --- | --- | --- | --- |
| Liquid Chicken flavor | 5 | 4.2 | Nice smell, round, balanced, less harsh, mild, fenugrek like aroma, coriander (2), lingers, slightly toasted, nutty aroma & flavor |
| Spray Dried Chicken | 4.5 | 5 | Good, mild, coriander aroma & taste |
| Standard Plating on maltodextrin | 3.5 | 3 | Weaker (3), mild, coriander aroma & taste |
| Standard Plating on salt | 5 | 3.8 | Rather flat, weaker flavor, weak aroma, flat flavor |
| Plated Emulsion viscous 2DE (200-500 µm) | 5.5 | 4.6 | Strong harsh, more balanced, coriander, biscuit toasted nice aroma, full flavor |
| Plated Emulsion viscous 2DE (500-800 µm) | 4.75 | 4.4 | Round, good, mild, good, better balanced chicken (2) |
| Plated Emulsion viscous 2DE (>800 µm) | 4 | 3.6 | Similar, weaker aroma, balanced aroma & flavor |

TABLE 8

Averaged aroma and flavor intensity of 7 flavor systems in chicken bouillon and comments cited by panellists

| | Aroma Intensity | Flavor Intensity | Comments |
| --- | --- | --- | --- |
| Liquid Chicken flavor | 4.7 | 5.5 | Balanced, meaty(3), chicken aroma, chicken good, Slightly pepper |
| Spray Dried Chicken | 5.5 | 5.8 | Weaker chicken, pepper, coriander (2), boiled |
| Standard Plating on maltodextrin | 5 | 4.8 | Weak, balanced, less pepper boost, chicken, balanced, not so strong |
| Standard Plating on salt | 4 | 4.7 | Very different, weaker (3), meaty, slightly acid off-notes, slightly oxydized, flat |
| Plated Emulsion viscous 2DE (200-500 µm) | 5.2 | 6.2 | Slightly weaker, pepper boost, chicken, typical boiled, coriander note, slightly pepper, more round, mouthfeel, culinary |
| Plated Emulsion viscous 2DE (500-800 µm) | 4.5 | 5.8 | Pepper, chicken, Meaty, brothy chicken, more round, mouthfeel, culinary. |
| Plated Emulsion viscous 2DE (>800 µm) | 5 | 5.3 | the strongest, harsh, Balanced (2), pepper, chicken, boiled fatty chicken. |

In general, the standard plating on maltodextrin and on salt were perceived weaker than the other samples. The flavor plated on salt was perceived as distorted, whereas all 3 fractions of emulsion prepared according to the process of the invention were found very similar to the spray dried powder.

2) Analytical Evaluation

All flavors were evaluated using AFFIRM® (Analysis of Flavors and Fragrances In Real time) at iso-active load. The dosages are provided in Table 9.

TABLE 9

Dosages of all flavor systems to achieve iso-active load

| | Dosage (%) |
|---|---|
| Spray Dried Chicken | 0.0105 |
| Standard Plating on maltodextrin | 0.010 |
| Standard Plating on salt | 0.040 |
| Plated Emulsion viscous 2DE (200-500 µm) | 0.019 |
| Plated Emulsion viscous 2DE (500-800 µm) | 0.008 |
| Plated Emulsion viscous 2DE (>800 µm) | 0.008 |

Figure 7:
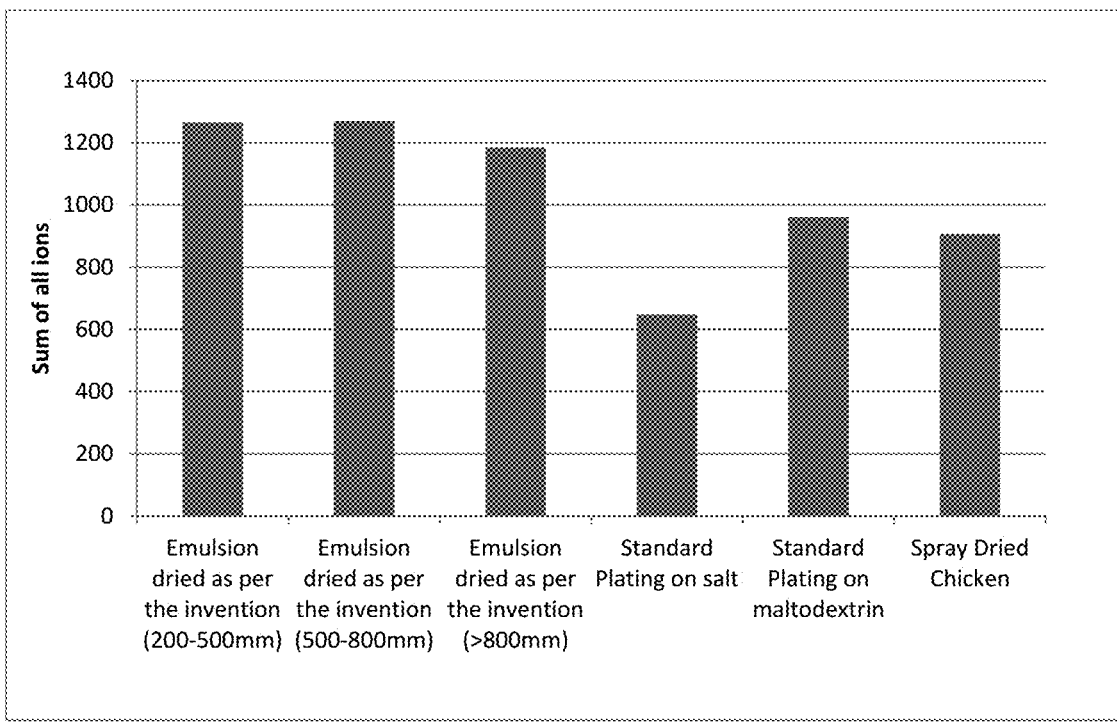
FIG. 7 illustrates a comparison between flavor and aroma intensities of an emulsion dried according to the process of the invention and other drying processes namely spray-drying and standard plating. Sum of all ions released from 6 dissolved powders.

Each flavor system was placed in a 500 ml Schott bottle. 100 ml of boiling water was added to the Schott bottle which was then sealed and stirred and allowed to equilibrate for 2 minutes. The headspace was sampled for 1 minute. The signal intensity of each molecule released from the dissolved powders in the headspace was determined by subtracting the background signal from the sample signal. The sum of all ions or molecules measured released from 6 dissolved powder is represented in FIG. 7. Flavor delivery from the plated emulsion irrespective of the fraction measured, the flavor release is higher than spray dried and standard plating and maintains a flavor profile that is similar to spray dried powder.

Example 9

Performance of Powdered Microcapsules According to the Invention in an Anti-Perspirant Stick The tests were carried out using a standard anti-perspirant stick base. The stick base with the final composition given in table 10 was prepared according to the following protocol:

Part A was heated to 75° C. and mixed well,
Part B was dispersed in Part A and mixed well, and
Finally, perfume was added and mixed well,

TABLE 10 composition of an anti-perspirant stick

| PART | INGREDIENTS | Amount (%) |
|---|---|---|
| A | Cyclomethicone [1] | 55 |
| | Stearyl Alcohol [2] | 21 |
| | PPG-14 Butyl Ether [3] | 2 |
| | Hydrogenated Castor Oil [4] | 1 |
| B | Aluminium Zirconium tetrachlorohydrex-Gly [5] | 20 |
| D | Perfume | 1 |

[1] DOW CORNING 345 FLUID, origin: DOW CORNING
[2] LANETTE 18, origin: BASF
[3] TEGOSOFT PBE, origin: EVONIK GER
[4] CUTINA HR, origin: BASF
[5] SUMMIT AZP-908, origin: IMCD Powdered Microcapsules Obtained by a Process According to the Invention Applied to a Combination of Free Perfume and Microencapsulated Perfume A free perfume (50 wt %) was emulsified with Hi-Cap (25 wt %) in water (25 wt %) using an Ultra-Turrax®.

Then this emulsion was mixed with the same amount of a suspension of polyurea microcapsules obtained according to WO 2011/154893 A1 (suspension containing 44 wt % microcapsules), by the mean of a mechanical empeller. The final suspension contained 50 wt % microcapsules suspension, i.e 22 wt % microcapsules, 25 wt % free perfume, 12.5 wt % Hi-cap.

Then, 210 g of dried 2DE maltodextrin were transferred into a cutter blender followed by 53 g of the above suspension. The two phases were blended for 30 seconds until homogenization, before adding 4 g of silicon dioxide flowing agent and mixing again before sifting.

The blend was sifted through 6 sieves of mesh size 1400/1250/500/200/125/71 µm. The following fractions were obtained:

| Fraction | Mass (g) | Distribution (%) | % perfume by GC-MS |
|---|---|---|---|
| >1400 µm | 6.1 | 2.3% | — |
| >1250 µm | 1.3 | 0.5% | — |
| >500 µm | 41.5 | 15.7% | 25.9% |
| >200 µm | 47.1 | 17.8% | 13.0% |
| >125 µm | 48.8 | 18.4% | 1.6% |
| >71 µm | 58.0 | 21.9% | 0.8% |
| <71 µm | 62.3 | 23.5% | 4.2% |

Two samples of 40 g made with the fraction >500 µm (perfume loading 25.9%) have been prepared in the anti-perspirant stick:

Samples comprise:
0.92 g of invention's powdered microcapsules, and
39.08 g of anti-perspirant composition (see table 10), which correspond to 0.6% perfume.

0.07 g of stick product was applied on paper blotter 12 cm*4.5 cm. Three blotters are prepared and stored for 3 hours on a hot plate at 37° C.

3 expert panelists assessed the olfactive intensity of the blotters, using a scale from "0" (no odor) to "10" (very strong):

One blotter is kept as such to evaluate the diffusion of the capsule,
The second blotter is rubbed with one finger to evaluate the boost after rubbing,
Water is sprayed on the third blotter.

TABLE 11

Olfactive performance of the powdered microcapsules in an anti-perspirant stick

| | Diffusion | After rubbing | After spraying water |
|---|---|---|---|
| Score/10 | 3.5 | 3.9 | 3.8 |

As shown in table 11, perfume impact is noticeable on dry paper strip, with a small boost upon rubbing or after water addition.

Example 10

Performance of Powdered Microcapsules According to the Invention in a Powder Detergent Powdered Microcapsules Obtained by a Process According to the Invention Applied to a Free Perfume (Powdered Microcapsules A)

The powdered microcapsules A was prepared according to the present invention as follows:

A viscous emulsion was prepared by shearing 100 g Perfume B (see table below) in an aqueous solution containing 60 g HiCap® and 40 g water, using an ultra-turrax (perfume/Hicap/water 50/30/20 w/w/w).

Then 100 g of this concentrate emulsion was blended 30 seconds within 398 g maltodextrin 2DE using a cutter-blender, followed by the addition of 2 g silicon dioxide, before mixing again for 30 seconds. A nicely free-flowing powder was obtained.

| Ingredients (Perfume B) | Part |
|---|---|
| (+−)-ETHYL 2-METHYLBUTANOATE | 2.70% |
| ALDEHYDE C8 | 1.20% |
| LIMONENE | 2.00% |
| LINALOL | 6.00% |
| (1RS,2RS)-2,4-DIMETHYL-3-CYCLOHEXENE-1-CARBALDEHYDE (A) + (1RS,2SR)-2,4-DIMETHYL-3-CYCLOHEXENE-1-CARBALDEHYDE (B) | 2.40% |
| ALLYL HEPTANOATE | 2.10% |
| ALLYL HEPTANOATE | |
| ALLYL HEPTANOATE | |
| TERPINOLENE | 1.80% |
| ALDEHYDE C10 | 1.90% |
| SCLAREOLATE ®[1)] | 9.00% |
| GERANIOL | 4.60% |
| (E)-3,7-DIMETHYL-2,6-OCTADIENAL | 4.50% |
| (1R,2R)-1,7,7-TRIMETHYL-BICYCLO[2.2.1]HEPT-2-YL ACETATE | 5.40% |
| CIS-4-(2-METHYL-2-PROPANYL)CYCLOHEXYL ACETATE AND TRANS-4-(2-METHYL-2-PROPANYL)CYCLOHEXYL ACETATE | 19.40% |
| 1,1'-OXYDIBENZENE | 5.80% |
| (3E)-4-(2,6,6-TRIMETHYL-1-CYCLOHEXEN-1-YL)-3-BUTEN-2-ONE | 7.40% |
| METHYL 2-((1RS,2RS)-3-OXO-2-PENTYLCYCLOPENTYL)ACETATE | 6.80% |
| ISO E SUPER [2)] | 3.70% |
| VERDYL ACETATE | 13.40% |

[1)](−)-PROPYL (S)-2-(1,1-DIMETHYLPROPOXY)PROPANOATE, Firmenich SA, Switzerland
[2)] 1-(octahydro-2,3,8,8-tetramethyl-2-naphtalenyl)-1-ethanone, IFF, USA The fragrance loading as measured by extraction and gas chromatography was 10 wt %.

Olfactive Performance

The tests were carried out using a classic powder detergent base (8-12% surfactants, 30-35% soda ash, 0-2% zeolite, 0-4% sodium silicate; 0-30% sodium chloride, 0-2% polymers, 5-8% moisture; sodium sulphate).

Two detergent powder samples were prepared for the blooming tests. The fragrance systems were as follows:

| Sample I | Perfume A (free perfume - see table below) | 0.42% |
|---|---|---|
| Sample II | Perfume A (free perfume) | 0.42% |
| | Powdered microcapsules according to the invention | 0.38% |

| Ingredients (Perfume A) | Part |
|---|---|
| PHENYLETHYL ACETATE | 9.12 |
| GERANIOL | 6.43 |
| (2E)-3-PHENYL-2-PROPEN-1-OL | 0.21 |
| UNDECANAL | 0.37 |
| CIS-4-(2-METHYL-2-PROPANYL)CYCLOHEXYL ACETATE (A) + TRANS-4-(2-METHYL-2-PROPANYL)CYCLOHEXYL ACETATE (B) | 1.98 |
| (+−)-3-(4-ISOPROPYLPHENYL)-2-METHYLPROPANAL | 0.45 |
| TRICYCLO[5.2.1.0(2,6)]DEC-3-EN-8-YL PROPANOATE (A) + TRICYCLO[5.2.1.0(2,6)]DEC-4-EN-8-YL PROPANOATE (B) | 0.22 |
| PENTYL 2-HYDROXYBENZOATE | 4.33 |
| (2E)-2-BENZYLIDENEOCTANAL | 2.5 |
| HABANOLIDE ®1) | 0.27 |
| METHYL BENZOATE | 0.71 |
| 2-PHENYLETHANOL | 16.25 |
| ALDEHYDE ANISIQUE | 2.55 |
| (E)-2-PENTYL-3-PHENYL-2-PROPENAL | 1.86 |
| ALPHA-TERPINEOL | 1.34 |
| GAMMA TEPINEOL | 0.5 |
| BENZYL ET SALICYLATE | 50.91 |

1)Pentadecenolide, Firmenich SA, Switzerland

The blooming tests were carried out as follows:
2 g of product is measured and placed into a plastic cup
200 ml of water (25° C.) is measured and given to the panellists.
1 plastic stirrer per product is also provided to the panellist.
One set of product and water is provided for each panellist.

A sensory panel was performed with 24 panellists that were asked to rate the perfume blooming intensity of the diluted detergent powder samples using a scale between 1 (non perceptible perfume) and 7 (very strong perfume intensity). The panels' results were then analysed with a 95% confidence interval (or 90% if needed) and variance was calculated using Duncan's post-hoc analysis ($\alpha$=0.05).

Figure 8:
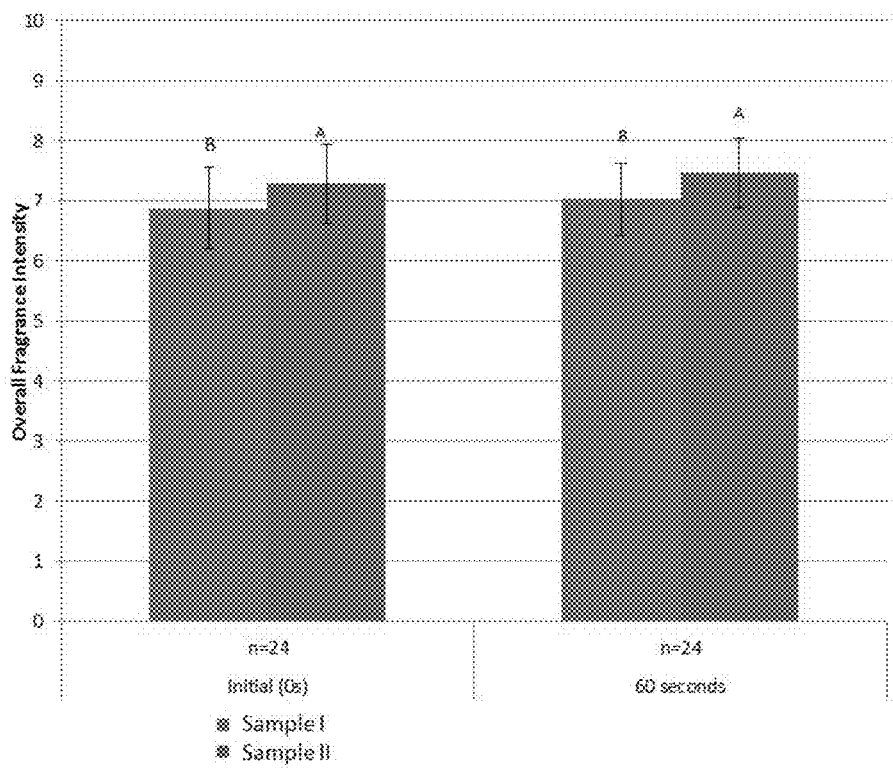
FIG. 8 illustrates the olfactive performance of powdered microcapsules according to the invention (sample II) and out the scope of the invention (sample I) in a powder detergent

The panel results show that at both initial evaluation (Os, after 5 stirs) and after 60 seconds, sample II comprising the invention's microcapsules was significantly stronger than the reference sample I (out of the scope of the invention) (see FIG. 8).

Example 11

Performance of Powdered Microcapsules According to the Invention in a Talcum Powder The tests were carried out using a standard talc base (100% talc, very slight characteristic odor, white powder, origin: LUZENAC).

Two samples of 40 g were prepared as follows: 0.56 g of powdered microcapsules (prepared according to example 10) was added to 39.44 g of talc. It corresponded to 0.14% of free fragrance.

Then, 0.5 g of talc product was poured into a cardboard cup. Two cups are prepared.

2 expert panelists assessed the olfactive intensity of the cups, using a scale from "0" (no odor) to "10" (very strong).:
One cup is kept as such to evaluate the diffusion of the capsule,
Water is sprayed in the second cup.

TABLE 12

Olfactive performance of the powdered microcapsules in a talcum powder

| | Diffusion | After spraying water |
|---|---|---|
| Talcum powder comprising the invention's microcapsules | 2.5 | 7 |

The above results underline a very good olfactive boost.

Example 12

Performance of a Beef Flavor According to the Invention

A viscous emulsion containing a beef flavor (Beef FL 706416 05601 AH, from Firmenich) was dried according to the present invention and compared to a liquid flavor and to a standard plating sample.

Preparation of the Powdered Microcapsules According to the Present Invention:

50 g of a viscous emulsion containing 12.5 g water, 12.5 g modified starch (Hicap 100®) and 25 g liquid beef flavor was prepared using a roto-stator homogenizer.

Then, 10 g of this emulsion was mixed with 89.5 g of maltodextrin 2DE using a kitchen cutter blender by shearing for 30 seconds. 0.5 g silicon dioxide was finally added before blending for 30 seconds more. The obtained sample containing 5% flavor is referred to as the dried flavor prepared according to the present invention.

Preparation of the Standard Plating Sample (Comparative):

As a control, the same beef flavor was applied onto maltodextrin 6DE by standard plating: 5 g liquid flavor were admixed to 95 g maltodextrin 6DE by shearing 30 seconds with a kitchen cutter blender. The obtained sample, containing 5% flavor, is referred to as the standard plating.

The flavor retention and release of both samples were characterized respectively by measuring the headspace above dry powders and wet powders by AFFIRM®:

Each flavor system was placed in a 500 ml Schott bottle. The headspace was sampled for 1 minute for each dry powder. Then, 100 ml of boiling water was added to the Schott bottle which was then sealed and stirred and allowed to equilibrate for 2 minutes. The headspace was sampled for 1 minute. The signal intensity of each molecule released from the dry and dissolved powders in the headspace was determined by subtracting the background signal from the sample signal. All signals were normalized to the highest intensity measured.

Figure 9:
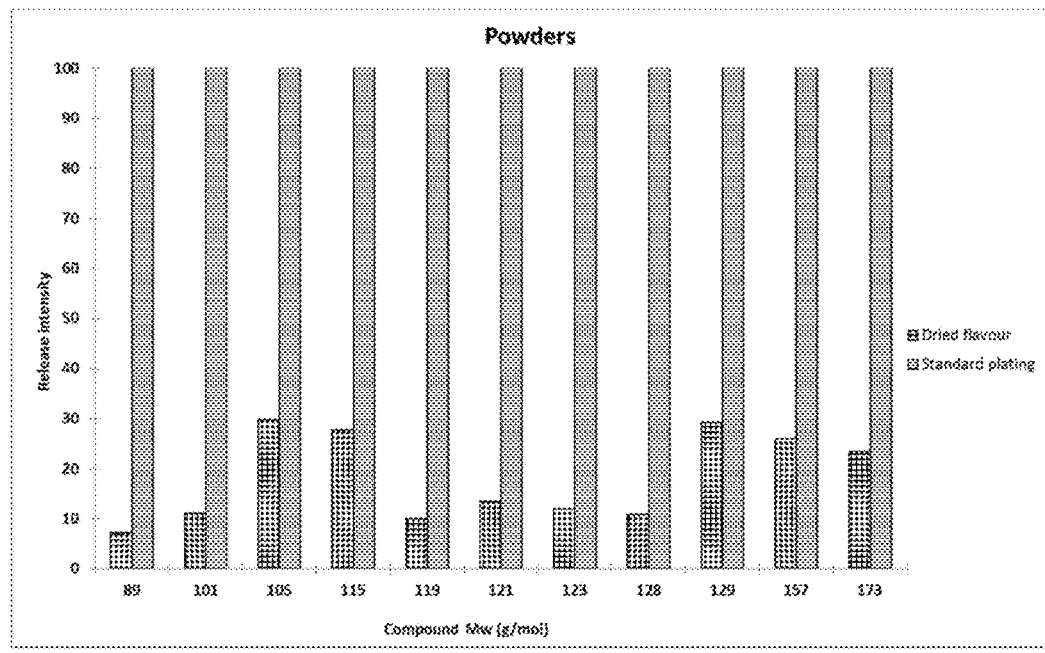
FIG. 9 illustrates the release profile for a dried flavour according to the invention and for a standard plating sample.

The release profile of the powders is represented in FIG. 9. The standard plating sample has the highest release intensity in the dry state on all the range of compounds' molecular weights, whereas the flavor dried according to the process of the invention releases much less in the dry state. This shows that the process described in the present invention ensures better flavor protection than regular plating.

Figure 10:
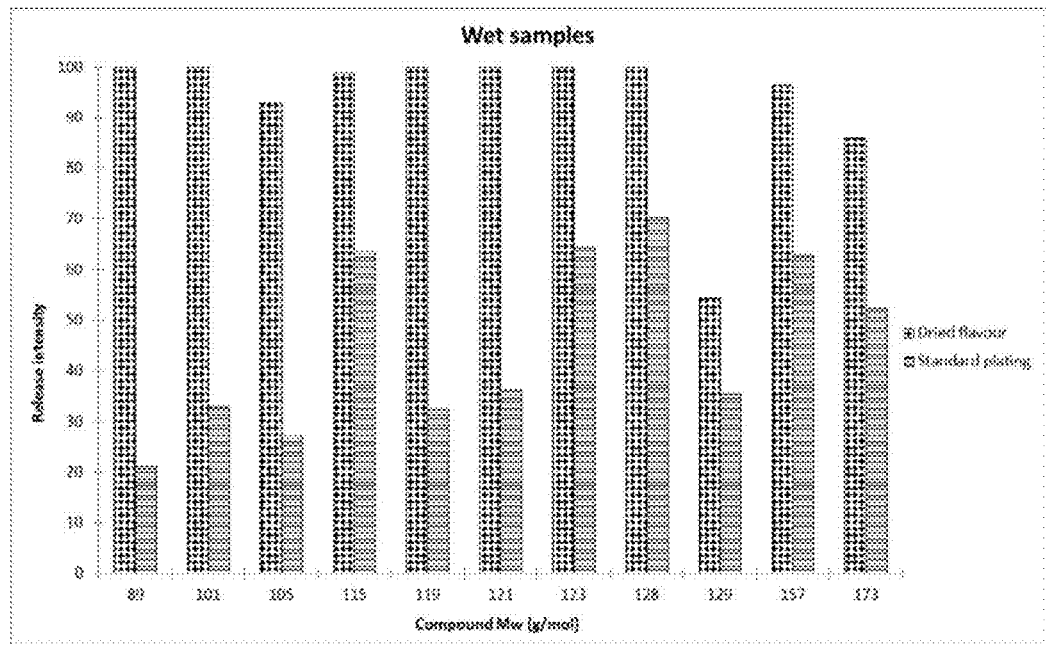
FIG. 10 illustrates the release profile for a dried flavour according to the invention and for a standard plating sample dissolved in hot water.

The release profile of the powders dissolved in hot water is represented in FIG. 10. The dried flavor of the invention releases more volatiles in the headspace than the standard plating after dissolution. This is explained by the fact that more volatiles were efficiently retained in the powder as observed in FIG. 9, and shows also that a more pronounced flavor boost is observed upon dissolution of the dried flavor.

Figure 11:
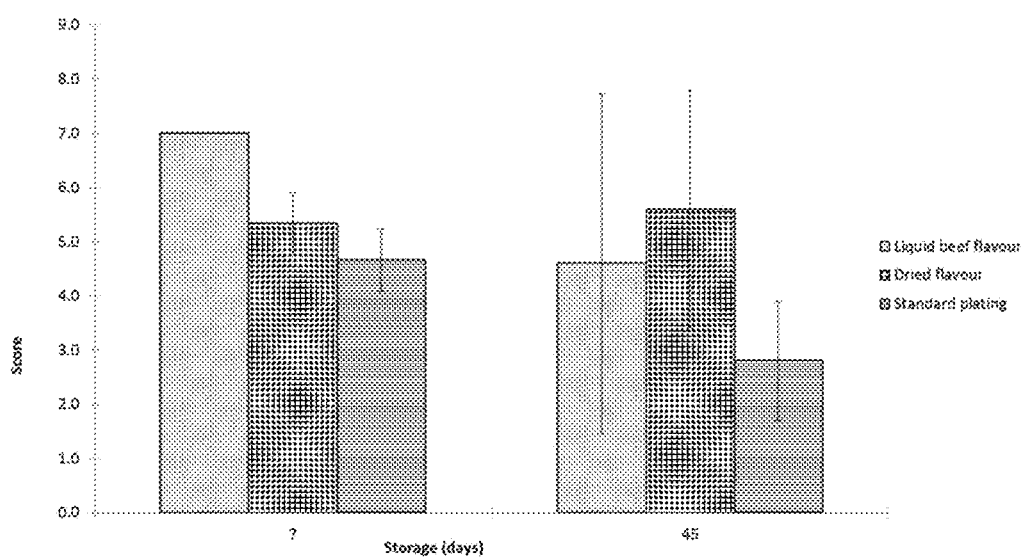
FIG. 11 illustrates a tasting panel after 45 days of storage for dried flavour according to the invention, for a standard plating sample (comparative) and for a liquid flavor (comparative).

The dried flavor, the standard plating and the original liquid flavor were stored at room temperature and were evaluated over time from the sensorial point of view. Tastings were performed over time with a group of trained panelists who were asked to blind-taste 3 solutions containing the dissolved samples in iso-load conditions. Table 13 describes the dosages of the 3 flavor systems to reach iso-load conditions in water. The panelists were asked to give a score for each solution on a scale between 0 and 10. The panel result is given in FIG. 11. We observe that after 45 days storage at room temperature the flavor dried by the present invention is perceived better that the original liquid flavor and the standard plating.

TABLE 13

| Dosage of the 3 flavor systems | |
| --- | --- |
| Sample | Dosage (%) |
| Liquid beef flavor | 0.005% |
| Dried flavor | 0.10% |
| Standard plating | 0.10% |

Example 13

Food Consumer Products Comprising the Flavouring Powdered Microcapsules According of the Invention Preparation of the Flavouring Powdered Microcapsules (Dried Flavor) According to the Present Invention:

50 g of a viscous emulsion containing 12.5 g water, 12.5 g HiCap 100 (modified starch) and 25 g of a liquid flavor was prepared using a roto-stator homogenizer.

Then, 20 g of this emulsion was mixed with 79 g of maltodextrin 2DE using a kitchen cutter blender by shearing for 30 seconds. 1 g silicon dioxide was finally added before blending for 30 seconds more. The obtained sample containing 10% flavor is referred to as the dried flavor powder prepared according to the present invention.

1—Basic Beef Noodles Seasoning

| Ingredients | Amount | Percent |
| --- | --- | --- |
| SALT | 70 grams | 34.5% |
| SUGAR | 16 grams | 7.9% |
| XANTHAN GUM | 3.6 grams | 1.8% |
| Monosodium glutamate | 24 grams | 11.8% |
| RIBOTIDE | 1.6 grams | 0.8% |
| MALIC ACID | 0.8 grams | 0.4% |
| PALM FAT | 8 grams | 3.9% |
| ONION POWDER | 7 grams | 3.4% |
| CARAMEL POWDER | 0.4 grams | 0.2% |
| BLACK PEPPER | 1.8 grams | 0.9% |
| Beef Flavour | 12 grams | 5.9% |
| YEAST EXTRACT | 14.4 grams | 7.1% |
| SILICONE DIOXIDE | 2 grams | 1% |
| MALTODEXTRINE | 38.4 grams | 18.9% |
| Dried beef flavor powder (10% beef flavour loading) | 3.00 | 1.5% (0.15% flavor) |
| Total | 203.000 grams | 100.00% |

Procedure:

Plate xanthan into sugar, add the rest of powder ingredients and mix. Add palm fat and mix till homogeneous.

2—Beef Burger in Oven

| Ingredients | Amount | Percent |
| --- | --- | --- |
| ICE WATER | 13.98 grams | 13.77% |
| SALT | 1 grams | 0.98% |
| CHOP RAW BEEF 5% FAT | 80 grams | 78.81% |
| BREAD CRUMBS | 5 grams | 4.93% |
| GROUND WHITE PEPPER | 0.02 grams | 0.02% |
| Dried beef flavor powder (10% flavor loading) | 1.50 grams | 1.48% (0.15% flavor) |
| Total | 101.50 grams | 100.00% |

Procedure:

Dilute the flavours in the water together with salt, pepper and add the bread crumbs. Mix all the ingredients thoroughly. Form the beef burger (70 g) and then freeze.

3-Chicken Bouillon Cube

| Ingredients | Amount |
| --- | --- |
| Onion Powder | 18 grams |
| Fine Salt | 412 grams |
| Maltodextrin | 147 grams |
| Dried Chicken Flavour powder (10% loading) | 15 grams |
| Ground White Pepper | 1.5 grams |
| Yeast extra Light | 45 grams |
| Chicken Fat | 140 grams |
| Sugar | 30 grams |
| Starch | 45 grams |
| Monosodium glutamate | 75 grams |
| Ribotide | 1.8 grams |
| Palm Oil | 70 grams |
| Total | 1000 grams |
| 100.00% | |

Procedure

Mix all ingredients thoroughly.

Make cubes.

4-Chicken Nuggets

| Meat core | |
| --- | --- |
| Ingredients | Amount (g) |
| Skinless Chicken Breast | 80.950 |
| Chicken Thigh | 4.550 |
| Sodium Tripolyphosphate | 0.450 |
| Salt | 1.000 |
| Cold Water | 8.500 |
| Emulsified Chicken Skin | 4.550 |
| Total | 100.0 |

Procedure

Combine phosphate with water until dissolved and add to salt.

Mince chicken meat (10 mm grind) and chicken skin (double pass, fine grind).

Mix chicken meat, skin and solution until liquid is absorbed.

Chill, form in mould, blast freeze.

| Predust | | |
| --- | --- | --- |
| Ingredients | Amount (g) | Percent |
| Unflavoured Predust | 13.500 | 54.00% |
| Dried chicken Flavour powder (10% loading) | 7.500 | 30.00% |
| Salt | 4.000 | 16.00% |
| Total | 25.000 | 100.00% |

Procedure

Mix predust.

Apply to core at 5% weight of meat.

| Nuggets (meat core + predust) | | |
| --- | --- | --- |
| Ingredients | Amount (g) | Percent |
| Tempura Batter | 1.400 | 8.28% |
| Frozen Core | 14.000 | 82.84% |
| Precook Predust | 0.700 | 4.14% |
| Breader | 0.800 | 4.73% |
| Total | 16.900 | 100.00% |

Procedure

Predust core.

Cook in a steam oven, 90° C., 90% steam for 5 minutes.

Coat in breader and tempura batter (mix 1:1.1 water)

Parfry at 190° C. for 35 secs.

Blast freeze.

5-Cocido "HAM"

| Meat | | |
| --- | --- | --- |
| Ingredients | Amount | Percent |
| Turkey Leg Meat | 155 grams | 75.61% |
| Chicken MRM | 50 grams | 24.39% |
| Total | 205.000 grams | 100.00% |

Procedure:

Prepare the good quantity of chicken and put in a water cold bath to defrost. Grind the Turkey meat in the grinder size 10 mm plate, keep in fridge.

| Marinade | | |
| --- | --- | --- |
| Ingredients | Amount | Percent |
| Ice/Water | 198.3 grams | 66.21% |
| Polyphosphate | 2 grams | 0.67% |
| Salt | 11 grams | 3.67% |
| sodium nitrite | 0.2 grams | 0.07% |
| Soy concentrate | 24 grams | 8.01% |
| Sugar | 5 grams | 1.67% |
| Potato starch | 50 grams | 16.69% |
| Sodium erythorbate | 0.5 grams | 0.17% |
| Carrageenan | 3 grams | 1.00% |
| Monosodium glutamate | 0.5 grams | 0.17% |
| Dried Chicken flavour powder (10% flavor load) | 5 grams | 1.67% |
| Total | 299.500 grams | 100.00% |

Procedure:

Dissolve phosphate in Ice water.

Add salt and cured salt (sodium nitrite).

Then add remaining ingredients and mix well with a handmixer until all dissolve.

Mix well Meat and Marinade together.

Add to the tumbler program 13 under vacuum for 1 hour.

Stay 14 hours in the refrigerator.

Tumble again 1 hour program 13 under vacuum.

Stuff into a cooking bag and seal under vacuum if possible.

Cook in oven 80° C. 100% steam 25 minutes until internal temperature 73° C.

Cool quickly in ice.
Store refrigerated at 4° C.

6-Vegetarian Beef Burger

|  |  | g | % |
|---|---|---|---|
| Protein | Pea Protein | 15 | 14.64% |
|  | Water (25° C.) | 59.31 | 57.87% |
| Texturant | Egg white | 8 | 7.81% |
| Thickening | Starch | 1 | 0.98% |
|  | Xantan | 0.2 | 0.20% |
| Vitablend | Palm Oil | 2.5 | 2.44% |
| DS | Yeast | 0.05 | 0.05% |
|  | Salt | 1 | 0.98% |
|  | White Pepper | 0.02 | 0.02% |
|  | Onion | 0.1 | 0.10% |
|  | Red color 10% in water | 3.3 | 3.22% |
|  | Caramel | 0.5 | 0.49% |
| Leavening | Baking powder | 1 | 0.98% |
| Oil | Rapeseed Oil | 6 | 5.85% |
| Fiber | Pea fiber | 3 | 2.93% |
| Flavour | Dried Beef Flavour powder (10% loading) | 1.5 | 1.46% |
|  | Total | 102.48 | 100.00% |

Procedure:

Blend water and colorants.

Hydrate textured pea protein 45 minutes.

Blend all ingredients (Thermomix® speed 2 REVERSE SENS), add slowly the oil and keep speed for 2 minutes. Stop and mix with a spoon.

Then continue to mix speed 2 for 3 minutes

Shape the Burgers (60 g)

Cook then 10 min in oven at 100° C.—50% RH

Deep fry 30 sec. at 170° C. Pack and deep freeze.

7-Vegetarian Chicken Nuggets

|  |  | g | % |
|---|---|---|---|
| Phase 1 | Textured soy protein concentrate | 11.5 | 11.48% |
|  | Water | 40 | 39.94% |
| Phase 2 | Isolate Soy Protein | 4.5 | 4.49% |
|  | Sunflower oil | 9 | 8.99% |
|  | Water | 23 | 22.97% |
| Phase 3 | Egg white powder | 5.5 | 5.49% |
|  | Salt | 0.8 | 0.80% |
|  | Potato Flakes | 4.3 | 4.29% |
|  | Yeast | 0.05 | 0.05% |
|  | Dried Chicken Flavour powder (10% loading) | 1.5 | 1.50% |
|  |  | 100.15 | 100.00% |

Procedure:

Hydrate soy protein concentrate in vacuum bag during 15 minutes (Phase 1),

Pre-mix isolate soy protein and water,

Mix phase 1 (Stephan®, cooking mixer), add the pre-mix (soy protein and water), when homogenous add oil slowly to form an emulsion.

Add all other ingredients as per the phases indicated in the recipe, mix between each ingredient during 30 seconds, Cut under vacuum for 1.5 minutes at speed 9 to shred the textured soy protein concentrate, Release vacuum, scrape and check if all the protein soy concentrate pieces have been shredded, Let under vacuum 1 bar for 1.5 minutes at speed 3.

Shape the nuggets and freeze for 1 hour

Example 14

Soft Drink Comprising Powdered Microcapsules According to the Invention

The dried lime flavour emulsion was prepared according to the present invention as follows:

A viscous emulsion was prepared by shearing 50 g lime flavour in an aqueous solution containing 12.5 g HiCap® and 12.5 g water, using a mechanic stirrer equipped with a propeller (flavour/Hicap/water 50/25/25 w/w/w).

Then 20 g of this concentrate emulsion was blended 30 seconds within 79 g maltodextrin 2DE using a cutter-blender, followed by the addition of 1 g silicon dioxide, before mixing again for 30 seconds. A nicely free-flowing powder was obtained.

For comparison, an emulsion of the same flavour was encapsulated by spray-drying. The composition of said spray-dried emulsion is:

16.6% Lime flavour 8.3% Capsul®

75.1% maltodextrin 18DE

Both samples were then formulated in powder soft drinks (Sample A comprising the powdered particles according to the invention and Sample B comprising spray-dried particles) so that the flavour content is 0.01%, according to the following table:

TABLE 14

Soft drink compositions

|  | Sample A g/L | Sample B g/L |
|---|---|---|
| Sugar | 270.18 | 270.18 |
| Citric Acid | 5.84 | 5.84 |
| Potassium Sorbate | 0.54 | 0.54 |
| Water | 724.98 | 725.38 |
| Powdered particles (invention) Load 10% | 1 |  |
| Spray Dried particles (comparative) Load 16.7% |  | 0.6 |

Out of 7 trained panelists, 4 preferred the sample prepared according to the present invention.

Example 15

Performance of Powdered Microcapsules According to the Invention in a Cat Litter The aim of this example is to determine the fragrance intensity of a cat litter comprising the powdered microcapsules according to this invention.

The cat litter used in this example was Fresh Step® Odor Shield Scoopable litter—unscented (origin: The Clorox® Company), having the following composition: 70-90% bentonite, 10-25% limestone, <6% silica and 0.1-1% sodium tetraborate pentahydrate.

A scented cat-litter comprising the powdered microcapsules at a weight concentration of approximately 0.51% was produced by adding 2.14 g of powdered microcapsules (prepared according to example 10) to 417.84 g of unscented cat litter in a 500 ml amber glass powder jar. The jar was sealed and the contents thoroughly blended using a Turbula® T2F shaker-mixer (origin: GlenMills®) for 15 minutes.

The fragrance intensity of the scented cat-litter was determined according to the following method. Two rectangular aluminium pans were partially filled with 200 g of the scented cat-litter, and the litter leveled. One of the cat-litter samples was treated with 5 ml of tap water (this is to simulate the effect of a cat urinating on the litter). The aluminium pans were placed into two separate 5 gallon (18.93 L) glass evaluation tanks and allowed to equilibrate for 15 minutes. The odour in the tanks was assessed by a panel of 8 untrained but experienced assessors. By "untrained but experienced assessors" we mean individuals who have not received formal olfactive training but who are used to participating in fragrances assessments and have experience in rating the intensity of an odour. The assessors were instructed to assess the tanks in a random order and indicate the intensity of the fragrance using a scale between 1 and 7; wherein, 1=no odour and 7=very strong odour. The mean perceived odour intensities of the two samples are shown in Table 15.

TABLE 15

Olfactive performance of the powdered microcapsules in a cat litter

| | Fragrance intensity |
|---|---|
| Cat litter comprising the powdered microcapsules according to the invention (dry, without water addition) | 3.89 |
| Cat litter comprising the powdered microcapsules according to the invention (wet, with water addition) | 3.63 |

The above results demonstrate that the powdered microcapsules according to the invention provide a good olfactory performance in a cat-litter at both the dry and wet stages; and, thus confirm that the microcapsules are suited for use in a cat-litter.

What is claimed is:

1. A process for preparing a powdered microencapsulated composition comprising the steps of:
   a) Preparing an oil-in-water suspension containing
      (i) an oil phase comprising a volatile active ingredient said oil being dispersed in
      (ii) a water phase including a water-soluble carbohydrate carrier; and
      (iii) optionally an emulsifier
      wherein the weight ratio between the oil phase and the water is above 1;
   b) Blending at room temperature the suspension obtained under step a) with a desiccant powder to form a dry microcapsule powder, said process being characterized in that the weight difference Δ between the water sorption of the desiccant and the water sorption of the carrier, at 50% relative humidity and at 25° C., is positive;
   c) Optionally sifting the obtained powder to remove the excess desiccant;
   wherein the process is free of any spray-drying step.

2. The process according to claim 1, wherein the suspension comprises a perfume or a flavour freely dispersed in the water phase.

3. The process according to claim 1, wherein the suspension comprises a perfume or flavour oil wherein part of said oil is freely dispersed in the water phase and another part of the oil is dispersed in an encapsulated form in the water phase.

4. The process according to claim 1, wherein the suspension comprises a perfume or flavour oil wherein the oil is dispersed in an encapsulated form in the water phase.

5. The process according to claim 1, wherein the water-soluble carbohydrate carrier is present in an amount comprised between 25 and 40 wt % of the suspension.

6. The process according to claim 1, wherein the desiccant is used in an amount such that the weight ratio between the desiccant and the liquid suspension is comprised between 1 and 9.

7. The process according to claim 1, wherein the water-soluble carbohydrate carrier comprises of at least one emulsifying polymer with a molecular weight (Mn) below 3000 Dalton.

8. The process according to claim 1, wherein the water-soluble carbohydrate carrier comprises at least one starch hydrolysate with a molecular weight (Mn) lower than 1500 Dalton, and the suspension comprises an emulsifier, selected from the group consisting of lecithin, glycerol esters, fatty acid esters, saponins, proteins, gum arabic; and
   mixtures thereof.

9. The process according to claim 1, wherein the desiccant is selected from the group consisting of maltodextrin, starch, polyvinyl acetate, polyvinyl alcohol, dextrines, natural or modified starch, vegetable gums, pectins, xanthanes, alginates, carragenans, cellulose derivatives and mixtures thereof.

10. The process according to claim 1, wherein a flowing agent is added to the suspension, wherein the flowing agent is selected from the group consisting of silicate, rice hull fibers, tricalcium phosphate and magnesium stearate.

11. The process according to claim 3, wherein the encapsulated perfume or flavor consists of water-insoluble microcapsules obtainable by a process selected from the group consisting of interfacial polymerisation, polycondensation, simple and complex coacervation.

12. The process according to claim 1, wherein the weight ratio between the oil phase and the water is above 1.5.

13. The process according to claim 1, wherein Δ is at least 1%.

14. The process according to claim 1, wherein Δ is at least 2%.

15. The process according to claim 1, wherein the volatile active ingredient is a perfume or a flavor.

16. The process according to claim 1, wherein the powdered microcapsules have a coefficient of circularity below 0.70.

* * * * *